US012761910B2

(12) United States Patent
Naidoo et al.

(10) Patent No.: US 12,761,910 B2
(45) Date of Patent: Oct. 13, 2026

(54) METHODS AND APPARATUS TO PROVIDE VERSION CONTROL IN A PROCESS CONTROL SYSTEM GRAPHICAL USER INTERFACE DEVELOPMENT ENVIRONMENT

(71) Applicant: Fisher-Rosemount Systems, Inc., Round Rock, TX (US)

(72) Inventors: Julian Kevin Naidoo, Cedar Park, TX (US); Drew Thomas Noah, Austin, TX (US); Mariana Costa Dionisio, Austin, TX (US); Camilo Tercero Fadul, Round Rock, TX (US)

(73) Assignee: Fisher-Rosemount Systems, Inc., Round Rock, TX (US)

( * ) Notice: Subject to any disclaimer, the term of this patent is extended or adjusted under 35 U.S.C. 154(b) by 280 days.

(21) Appl. No.: 18/592,112

(22) Filed: Feb. 29, 2024

(65) Prior Publication Data

US 2025/0278266 A1 Sep. 4, 2025

(51) Int. Cl.

| | |
|---|---|
| ***G06F 8/71*** | (2018.01) |
| ***G06F 8/38*** | (2018.01) |
| ***G06F 16/178*** | (2019.01) |

(52) U.S. Cl.

CPC .................. *G06F 8/71* (2013.01); *G06F 8/38* (2013.01); *G06F 16/178* (2019.01)

(58) Field of Classification Search

CPC ............. G06F 8/38; G06F 8/71; G08F 16/178

USPC .................................. 717/168–178, 120–122

See application file for complete search history.

(56) References Cited

U.S. PATENT DOCUMENTS

| | | | | |
|---|---|---|---|---|
| 7,716,182 | B2 * | 5/2010 | Tewksbary | G06F 16/172 707/638 |
| 7,716,636 | B2 * | 5/2010 | Goncharenko | G06F 8/70 717/113 |
| 8,060,862 | B2 * | 11/2011 | Eldridge | G06F 8/71 717/121 |

(Continued)

OTHER PUBLICATIONS

Siemens AG, "SIMATIC PCS 7 Process Control System", 2018, retrieved from www.siemens.com/simatic-pcs7 , 92 pages. (Year: 2018).*

(Continued)

*Primary Examiner* — Ted T. Vo

(74) *Attorney, Agent, or Firm* — Hanley, Flight & Zimmerman, LLC

(57) ABSTRACT

Systems, apparatus, articles of manufacture, and methods to provide version control in a process control system development environment are disclosed. Example instructions cause at least one processor to at least cause presentation of a first graphical user interface to enable editing of a second graphical user interface of a process control system, the second graphical user interface based on information stored in a database, access a user instruction to modify the second graphical user interface from a first version to a second version, access user commit information associated with the second version, export the second version of the second graphical user interface from the database to a local file repository, and synchronize the second version from the local file repository to a remote repository, the synchronization to include the user commit information.

21 Claims, 13 Drawing Sheets

(56) References Cited

U.S. PATENT DOCUMENTS

| | | | | |
|---|---|---|---|---|
| 8,185,892 | B2 * | 5/2012 | Lucas | H04L 67/51 717/109 |
| 9,063,739 | B2 * | 6/2015 | Ward | H04L 41/0856 |
| 11,204,690 | B1 | 12/2021 | Hoberman et al. | |
| 11,726,933 | B2 * | 8/2023 | Amaro, Jr. | G06F 13/20 710/5 |
| 2018/0011824 | A1 | 1/2018 | Goldstein et al. | |
| 2021/0191543 | A1 | 6/2021 | Kim et al. | |
| 2022/0236697 | A1 | 7/2022 | Stump et al. | |
| 2024/0053712 | A1 * | 2/2024 | Nixon | G05B 19/4186 |

OTHER PUBLICATIONS

Michael Ernst, "Version Control Concepts and Best Practices", 2023, https://homes.cs.washington.edu/~mernst/advice/version-control.html , 9 pages. (Year: 2023).*

International Searching Authority, "Written Opinion," issued in connection with International Patent Application No. PCT/US2025/017396, mailed on May 1, 2025, 10 pages.

International Searching Authority, "International Search Report," issued in connection with International Patent Application No. PCT/US2025/017396, mailed on May 1, 2025, 5 pages.

* cited by examiner

METHODS AND APPARATUS TO PROVIDE VERSION CONTROL IN A PROCESS CONTROL SYSTEM GRAPHICAL USER INTERFACE DEVELOPMENT ENVIRONMENT

FIELD OF THE DISCLOSURE

This disclosure relates generally to version control and, more particularly, to methods and apparatus to provide version control in a process control system graphical user interface (GUI) development environment.

BACKGROUND

Process control systems are designed to be used by end-users and can be used to control many different processes and/or tasks. Developers of such process control systems design the process control system using various editing tools including, for example, text editors, integrated development environments, graphical editors, etc. These editing tools generate various configuration files, executables, and/or user interfaces that are deployed to an end-user environment. Designing robust user interfaces for use in the end user environment is a time-consuming task that is often performed by multiple developers.

BRIEF DESCRIPTION OF THE DRAWINGS

In general, the same reference numbers will be used throughout the drawing(s) and accompanying written description to refer to the same or like parts. The figures are not necessarily to scale.

DETAILED DESCRIPTION

User interfaces of process control systems are commonly designed and/or developed using a graphical user interface editor. Development of these user interfaces is typically a time-consuming process that, in some examples, may be performed by multiple developers utilizing multiple computer systems. Ensuring that developers are working cooperatively is important. To that end, example approaches disclosed herein enable version control within a process control system development environment. Using version control enables multiple developers to cooperatively work on the same code repository.

Graphical process control system development environments typically store configuration information within a database that is local to the process control development circuitry. In other words, configuration information is stored within databases and/or other information structures that are local to each computer on which prospective developers may operate. Alternatively, some example graphical process control system development environments store configuration information in a centralized database accessed by each workstation on which prospective developers may operate. Example approaches disclosed herein enable synchronization of data stored within the database with a remote repository. Developers may, for example, perform various version control operations including committing, staging, publishing, updating, etc.

To enable such synchronization, example approaches disclosed herein export information from the local database to a local repository (e.g., a file directory, a file structure, etc.) and synchronize information stored in the local repository with the remote repository. Advantageously, version control operations such as comparing histories of versions submitted and/or showing differences between versions can be performed without having to import such versions into the local database. In some examples, the local repository may be implemented at a computing device separate from the computing device on which the graphical process control system development environment is operated. For example, the local repository may be stored at a network attached storage (NAS) device. In such an example, the local repository might be common to two or more graphical process control system development environments.

Figure 1:
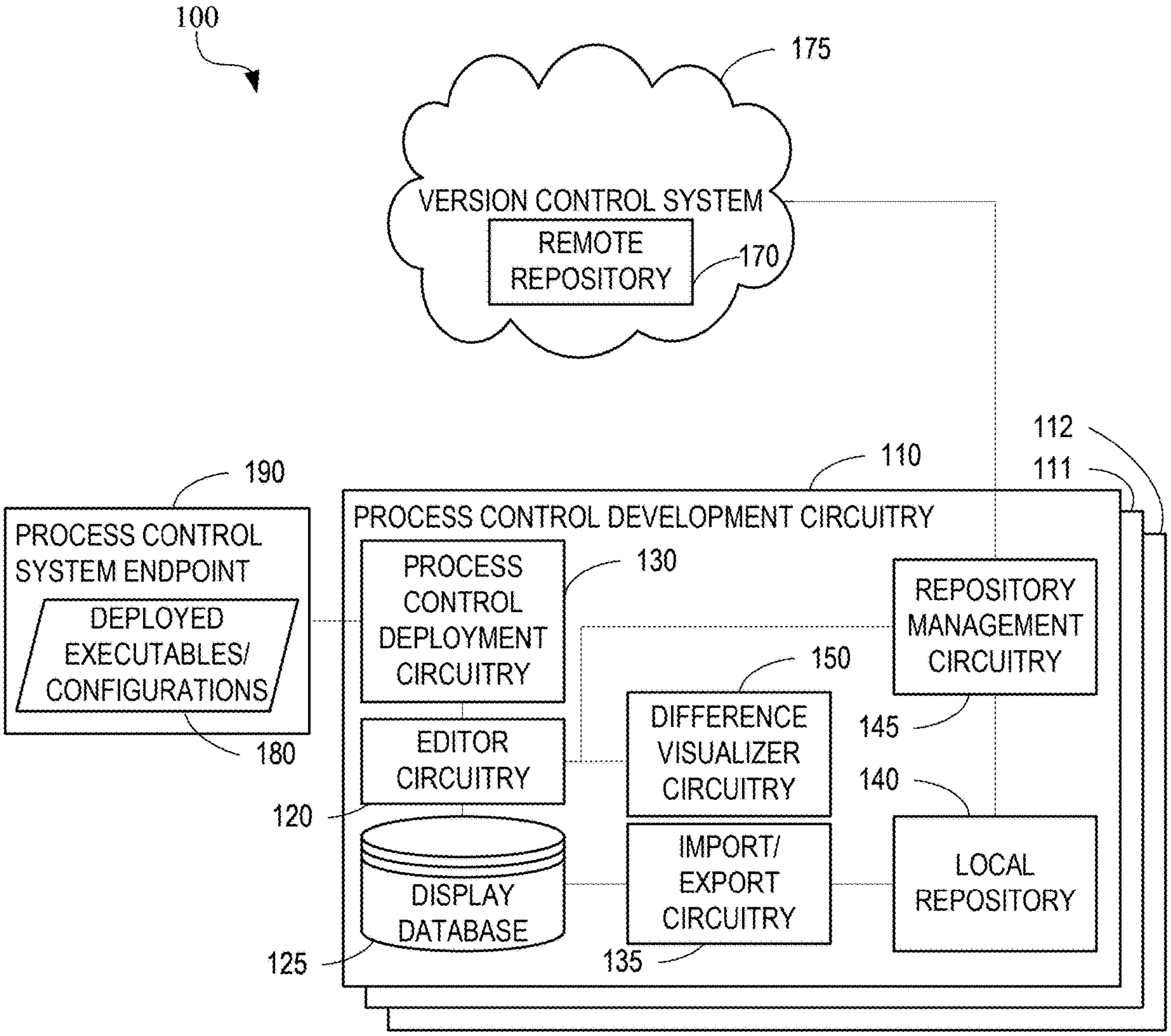
FIG. 1 is a block diagram of an example environment in which an example process control development environment operates to provide version control within a graphical user interface editor of a process control system.

FIG. 1 is a block diagram of an example environment 100 in which example process control development circuitry 110 operates to provide version control within a graphical user interface editor. The example process control development circuitry 110 of the illustrated example of FIG. 1 includes editor circuitry 120, a display database 125, process control deployment circuitry 130, import/export circuitry 135, a local repository 140, repository management circuitry 145, and difference visualizer circuitry 150. The example repository management circuitry 145 performs version control operations to synchronize information between the local repository 140 and a remote repository 170 within a version control system 175. The example process control deployment circuitry 130 deploys executables and/or configurations 180 to a process control system endpoint 190.

In the illustrated example of FIG. 1 multiple process control development circuitries 110, 111, 112 are shown. This illustrates, for example, that multiple developers may operate corresponding process control development circuitry to modify a user interface for use in a process control system. In such an example, multiple developers may work on a single user interface and have their changes merged using the version control system. Using such an approach enables more efficient development of user interfaces for use in process control systems.

The process control development circuitry 110 of FIG. 1 may be instantiated (e.g., creating an instance of, bring into being for any length of time, materialize, implement, etc.) by programmable circuitry such as a Central Processor Unit (CPU) executing first instructions. Additionally or alternatively, the process control development circuitry 110 of FIG. 1 may be instantiated (e.g., creating an instance of, bring into being for any length of time, materialize, implement, etc.) by (i) an Application Specific Integrated Circuit (ASIC) and/or (ii) a Field Programmable Gate Array (FPGA) structured and/or configured in response to execution of second instructions to perform operations corresponding to the first instructions. It should be understood that some or all of the circuitry of FIG. 1 may, thus, be instantiated at the same or different times. Some or all of the circuitry of FIG. 1 may be instantiated, for example, in one or more threads executing concurrently on hardware and/or in series on hardware. Moreover, in some examples, some or all of the circuitry of FIG. 1 may be implemented by microprocessor circuitry executing instructions and/or FPGA circuitry performing operations to implement one or more virtual machines and/or containers.

The example editor circuitry 120 of the illustrated example of FIG. 1 causes presentation of a user interface (e.g., an editor UI) with which a developer may interact to edit a graphical user interface. The example editor circuitry 120 accesses such edits as input by the user and applies the edits to a process control system configuration stored in the display database 125. When operating the editor circuitry 120, a developer may provide a versioning instruction, which causes the editor circuitry 120 to trigger other components of the process control development circuitry 110 to perform the requested versioning instruction. In some examples, the example editor circuitry 120 is instantiated by programmable circuitry executing editor instructions and/or configured to perform operations such as those represented by the flowchart(s) of FIGS. 2.

In some examples, the process control development circuitry 110 includes means for editing a graphical user interface. For example, the means for editing may be implemented by the editor circuitry 120. In some examples, the editor circuitry 120 may be instantiated by programmable circuitry such as the example programmable circuitry 1212 of FIG. 12. For instance, the editor circuitry 120 may be instantiated by the example microprocessor 1300 of FIG. 13 executing machine executable instructions such as those implemented by at least blocks 210, 220, 230, 240, 250, 260, 310, 430 of FIGS. 2, 3, and/or 4. In some examples, the editor circuitry 120 may be instantiated by hardware logic circuitry, which may be implemented by an ASIC, XPU, or the FPGA circuitry 1400 of FIG. 14 configured and/or structured to perform operations corresponding to the machine readable instructions. Additionally or alternatively, the editor circuitry 120 may be instantiated by any other combination of hardware, software, and/or firmware. For example, the editor circuitry 120 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) configured and/or structured to execute some or all of the machine readable instructions and/or to perform some or all of the operations corresponding to the machine readable instructions without executing software or firmware, but other structures are likewise appropriate.

The example display database 125 of the illustrated example of FIG. 1 is implemented by any memory, storage device and/or storage disc for storing data such as, for example, flash memory, magnetic media, optical media, solid state memory, hard drive(s), thumb drive(s), etc. Furthermore, the data stored in the example display database 125 may be in any data format such as, for example, binary data, comma delimited data, tab delimited data, structured query language (SQL) structures, etc. While, in the illustrated example, the display database 125 is illustrated as a single device, the example display database 125 and/or any other data storage devices described herein may be implemented by any number and/or type(s) of memories. In the illustrated example of FIG. 1, the example display database 125 stores records that are used to represent a graphical user interface that is being developed by the editor circuitry 120 of the process control development circuitry 110. While in the illustrated example of FIG. 1 the display database 125 is illustrated as being local to the process control development circuitry 110, in some examples, the display database 125 may be implemented centrally with respect to two or more process control development circuitries. For example, a single database may be accessed by a first process control development circuitry and also by a second process control development circuitry.

The example process control deployment circuitry 130 of the illustrated example of FIG. 1 deploys the executables and/or configurations 180 from the display database 125 to a process control system endpoint 190. In some examples, the process control deployment circuitry 130 may deploy the executables and/or configurations 180 to multiple process control system endpoints. Additionally or alternatively, the process control deployment circuitry 130 may provide the configurations and/or executables to another computing device and/or system for deployment to the process control system endpoint(s).

In some examples, the process control development circuitry 110 includes means for deploying. For example, the means for deploying may be implemented by process control deployment circuitry 130. In some examples, the process control deployment circuitry 130 may be instantiated by programmable circuitry such as the example programmable circuitry 1212 of FIG. 12. For instance, the process control deployment circuitry 130 may be instantiated by the example microprocessor 1300 of FIG. 13 executing machine executable instructions. In some examples, the process control deployment circuitry 130 may be instantiated by hardware logic circuitry, which may be implemented by an ASIC, XPU, or the FPGA circuitry 1400 of FIG. 14 configured and/or structured to perform operations corresponding to the machine readable instructions. Additionally or alternatively, the process control deployment circuitry 130 may be instantiated by any other combination of hardware, software, and/or firmware. For example, the process control deployment circuitry 130 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) configured and/or structured to execute some or all of the machine readable instructions and/or to perform some or all of the operations corresponding to the machine readable instructions without executing software or firmware, but other structures are likewise appropriate.

The example import/export circuitry 135 of the illustrated example of FIG. 1 exports information from the display database 125 to the local repository 140. Likewise, the example import/export circuitry 135 imports information from the local repository 140 to the display database 125. The example import/export circuitry 135 transforms records within the display database 125 (e.g., one or more records in a SQL database table), to/from a file structure within the local repository 140. For example, a table and/or other object within the display database 125 may be represented as an extensible markup language (XML) file when stored in the local repository 140. In this manner, the local repository 140 may include a plurality of files that correspond to respective objects within the display database 125. Similarly, the XML file stored in the local repository 140 may be converted to an object within the display database 125.

Figure 3:
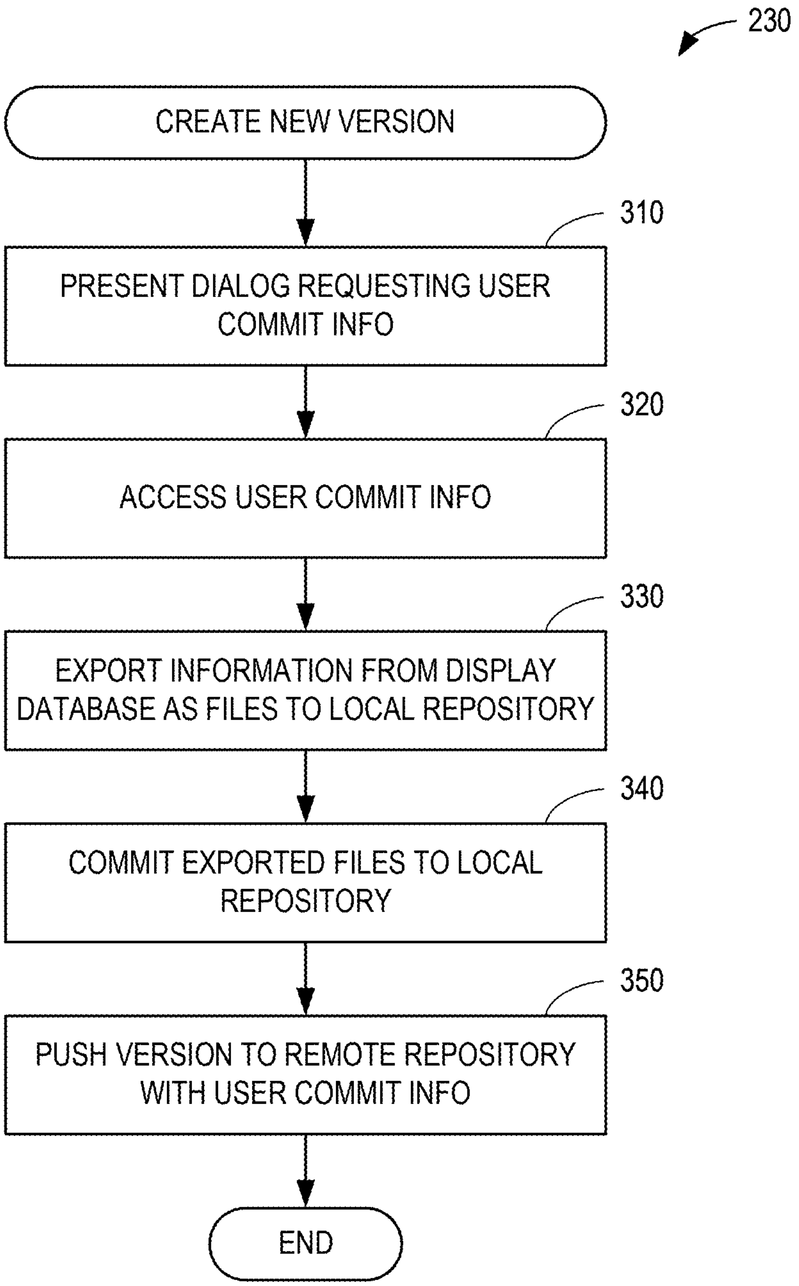
FIG. 3 is a flowchart representative of example machine readable instructions and/or example operations that may be executed, instantiated, and/or performed by example programmable circuitry to implement the process control development circuitry 110 of FIG. 1 to create a new version at the remote repository of FIG. 1.

In some examples, the import/export circuitry 135 is instantiated by programmable circuitry executing import/export instructions and/or configured to perform operations such as those represented by the flowchart(s) of FIGS. 3 and/or 4.

In some examples, the process control development circuitry 110 includes means for importing and/or exporting. For example, the means for importing and/or exporting may be implemented by import/export circuitry 135. In some examples, the import/export circuitry 135 may be instantiated by programmable circuitry such as the example programmable circuitry 1212 of FIG. 12. For instance, the import/export circuitry 135 may be instantiated by the example microprocessor 1300 of FIG. 13 executing machine executable instructions such as those implemented by at least blocks 330, 420 of FIGS. 3 and/or 4. In some examples, the import/export circuitry 135 may be instantiated by hardware logic circuitry, which may be implemented by an ASIC, XPU, or the FPGA circuitry 1400 of FIG. 14 configured and/or structured to perform operations corresponding to the machine readable instructions. Additionally or alternatively, the import/export circuitry 135 may be instantiated by any other combination of hardware, software, and/or firmware. For example, the import/export circuitry 135 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) configured and/or structured to execute some or all of the machine readable instructions and/or to perform some or all of the operations corresponding to the machine readable instructions without executing software or firmware, but other structures are likewise appropriate.

The example local repository 140 of the illustrated example of FIG. 1 is implemented by any memory, storage device and/or storage disc for storing data such as, for example, flash memory, magnetic media, optical media, solid state memory, hard drive(s), thumb drive(s), etc. Furthermore, the data stored in the example local repository 140 may be in any data format such as, for example, binary data, comma delimited data, tab delimited data, structured query language (SQL) structures, etc. While, in the illustrated example, the local repository 140 is illustrated as a single device, the example local repository 140 and/or any other data storage devices described herein may be implemented by any number and/or type(s) of memories. In the illustrated example of FIG. 1, the example local repository 140 stores a file structure that is monitored by the repository management circuitry 145.

While in the illustrated example of FIG. 1 the local repository 140 is illustrated as being local to the process control development circuitry 110, in some examples, the local repository 140 may be implemented centrally with respect to two or more process control development circuitries. For example, the local repository 140 may be implemented on a network attached storage (NAS) device and/or other file server that is accessible to multiple process control development circuitries. Thus, as used herein, the term local repository is intended to represent that the repository is not stored at the version control system 175.

The example repository management circuitry 145 of the illustrated example of FIG. 1 performs version control operations within the local repository 140 and/or the remote repository 170. For example, the example repository management circuitry 145 pushes a locally committed version to the remote repository 170 with user commit information, pulls a selected version from the remote repository 170 to the local repository, etc.

Figure 4:
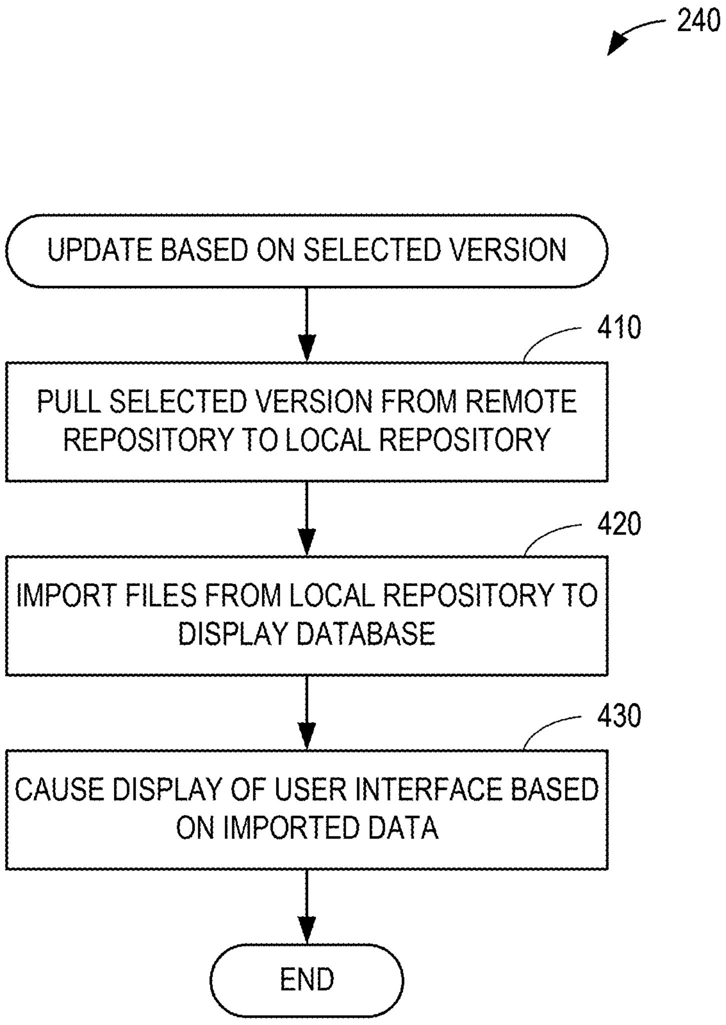
FIG. 4 is a flowchart representative of example machine readable instructions and/or example operations that may be executed, instantiated, and/or performed by example programmable circuitry to implement the process control development circuitry 110 of FIG. 1 to update the process control development environment of FIG. 1 with a selected version from the remote repository of FIG. 1.
Figure 5:
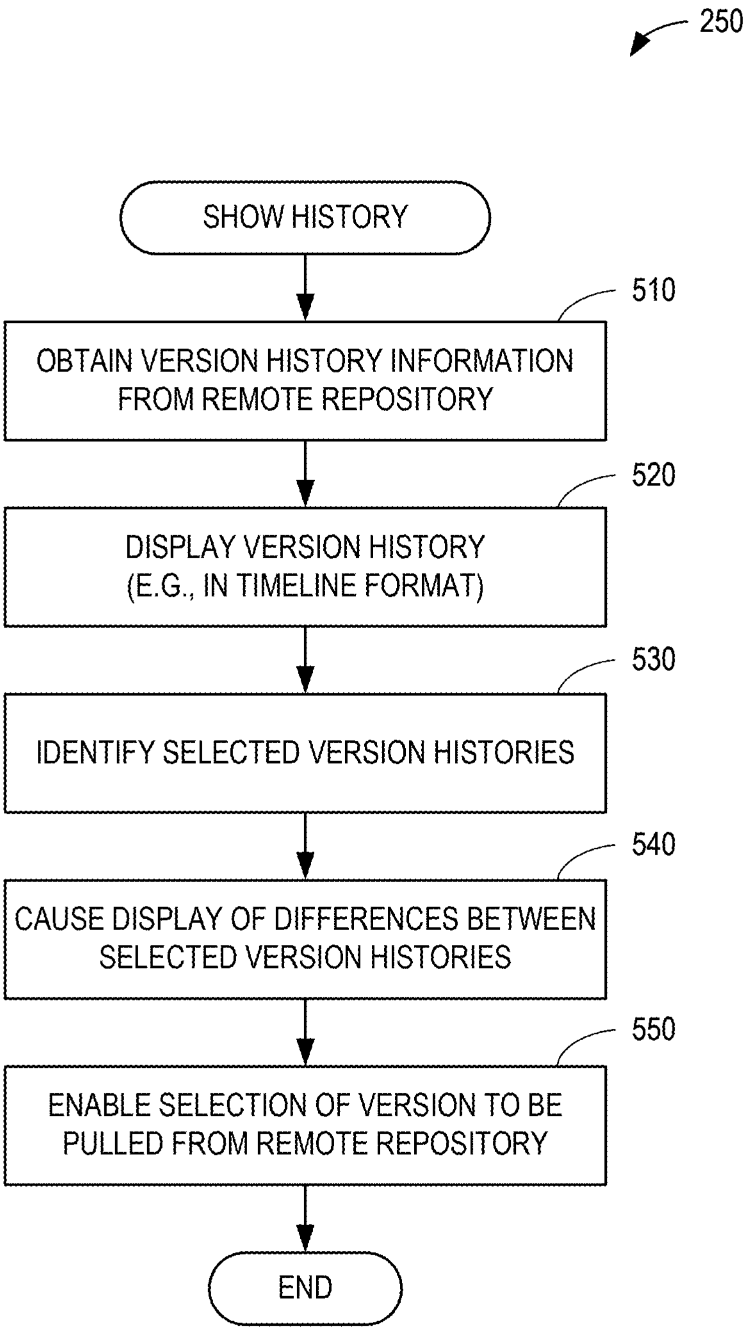
FIG. 5 is a flowchart representative of example machine readable instructions and/or example operations that may be executed, instantiated, and/or performed by example programmable circuitry to implement the process control development circuitry 110 of FIG. 1 to show a version history.

In some examples, the repository management circuitry 145 is instantiated by programmable circuitry executing repository management instructions and/or configured to perform operations such as those represented by the flowchart(s) of FIGS. 3, 4, 5, and/or 6.

In some examples, the process control development circuitry 110 includes means for determining a condition of a device. For example, the means for determining may be implemented by repository management circuitry 145. In some examples, the repository management circuitry 145 may be instantiated by programmable circuitry such as the example programmable circuitry 1212 of FIG. 12. For instance, the repository management circuitry 145 may be instantiated by the example microprocessor 1300 of FIG. 13 executing machine executable instructions such as those implemented by at least blocks 320, 340, 410, 420, 510, 520, 530, 540, 550, 620 of FIGS. 3, 4, 5, and/or 6. In some examples, the repository management circuitry 145 may be instantiated by hardware logic circuitry, which may be implemented by an ASIC, XPU, or the FPGA circuitry 1400 of FIG. 14 configured and/or structured to perform operations corresponding to the machine readable instructions.

Additionally or alternatively, the repository management circuitry 145 may be instantiated by any other combination of hardware, software, and/or firmware. For example, the repository management circuitry 145 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) configured and/or structured to execute some or all of the machine readable instructions and/or to perform some or all of the operations corresponding to the machine readable instructions without executing software or firmware, but other structures are likewise appropriate.

The example difference visualizer circuitry 150 of the illustrated example of FIG. 1 causes presentation of one or more graphical user interfaces that enable visualization of differences between two or more versions. In some examples, the example difference visualizer circuitry 150 causes presentation of a first representation of the user interface corresponding to a first version, in visual proximity to a second representation of the user interface corresponding to a second version (e.g., within a same dialog and/or same window within a graphical user interface). Causing presentation of two graphical representations of a user interface enables the developer to quickly understand the differences between the displayed versions.

Figure 6:
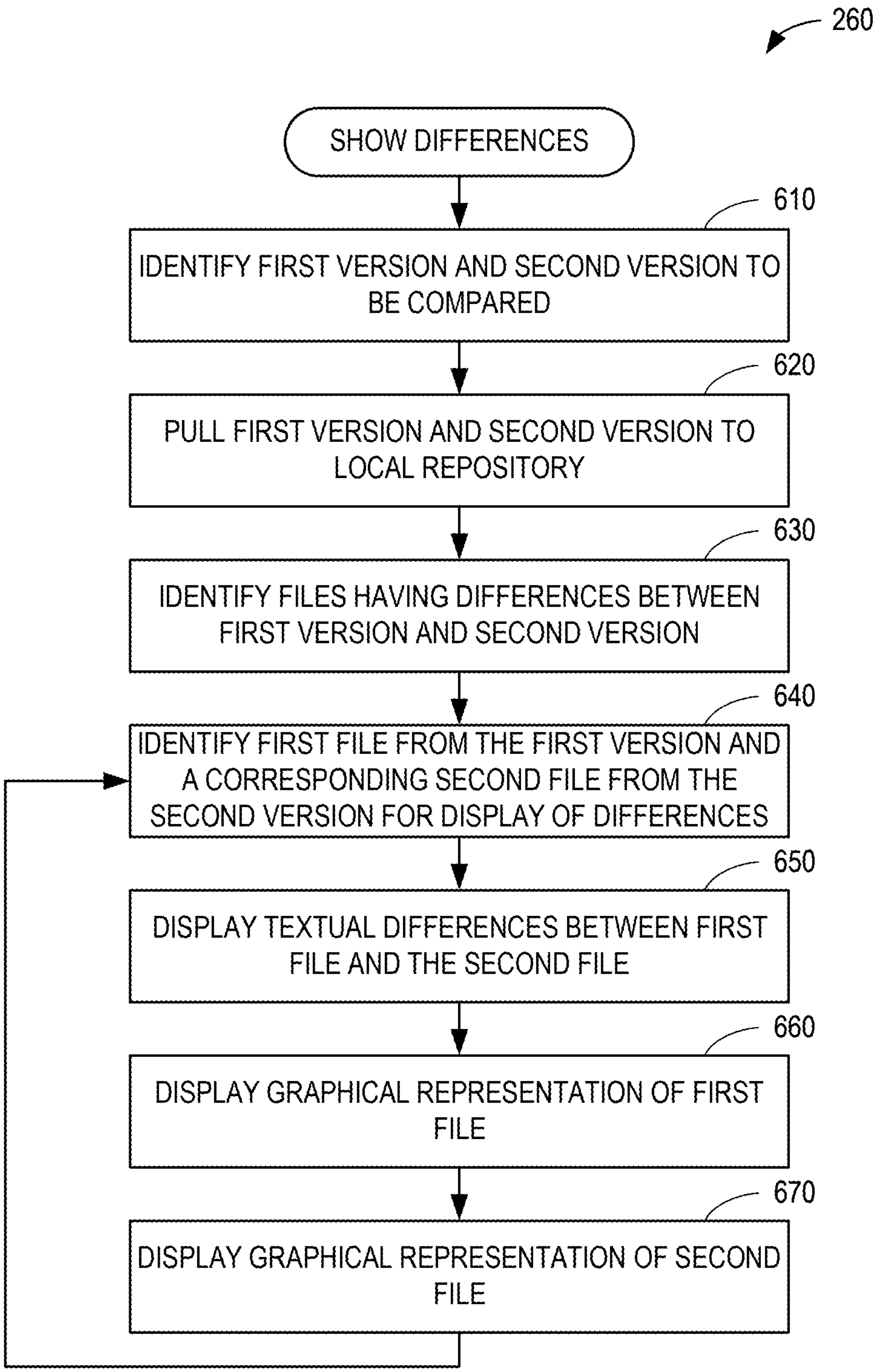
FIG. 6 is a flowchart representative of example machine readable instructions and/or example operations that may be executed, instantiated, and/or performed by example programmable circuitry to implement the process control development circuitry 110 of FIG. 1 to show differences between versions in the version history.

In some examples, the difference visualizer circuitry 150 is instantiated by programmable circuitry executing repository management instructions and/or configured to perform operations such as those represented by the flowchart(s) of FIG. 6.

In some examples, the process control development circuitry 110 includes means for visualizing differences. For example, the means for visualizing differences may be implemented by difference visualizer circuitry 150. In some examples, the difference visualizer circuitry 150 may be instantiated by programmable circuitry such as the example programmable circuitry 1212 of FIG. 12. For instance, the difference visualizer circuitry 150 may be instantiated by the example microprocessor 1300 of FIG. 13 executing machine executable instructions such as those implemented by at least blocks 610, 620, 630, 640, 650, 660, 670 of FIG. 6. In some examples, the difference visualizer circuitry 150 may be instantiated by hardware logic circuitry, which may be implemented by an ASIC, XPU, or the FPGA circuitry 1400 of FIG. 14 configured and/or structured to perform operations corresponding to the machine readable instructions. Additionally or alternatively, the difference visualizer circuitry 150 may be instantiated by any other combination of hardware, software, and/or firmware. For example, the difference visualizer circuitry 150 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) configured and/or structured to execute some or all of the machine readable instructions and/or to perform some or all of the operations corresponding to the machine readable instructions without executing software or firmware, but other structures are likewise appropriate.

The example version control system 175 represents a version control system hosted within a cloud environment. However, version control systems that do not rely on cloud environments may additionally or alternatively be used. The example version control system 175 hosts the remote repository 170. In some examples, multiple different remote repositories may be used across different organizations and/or teams of developers. For example, the first team of developers working on a first user interface may utilize a first remote repository, whereas a different team working on a different user interface may use a different remote repository. Additionally or alternatively, this different team may use a different version control system entirely.

The example process control system endpoint 190 represents one or more computers, devices, controllers. etc. that are used within a process control system. Such process control system endpoint(s) 190 may include various sensors, actuators, displays, and/or other input/output devices for use within the process control system. The example process control system endpoint 190 operates in accordance with deployed executables and/or configurations 180 that are provided to the example process control system endpoint 190 by the example process control deployment circuitry 130. In this manner, a developer operating the process control development circuitry 110 can deploy the executables and/or configurations 180 in accordance with the edits made by the editor circuitry 120.

While an example manner of implementing the process control development circuitry 110 of FIG. 1 is illustrated in FIG. 1, one or more of the elements, processes, and/or devices illustrated in FIG. 1 may be combined, divided, re-arranged, omitted, eliminated, and/or implemented in any other way. Further, the example editor circuitry 120, the example process control deployment circuitry 130, the example import/export circuitry 135, the example repository management circuitry 145, the example difference visualizer circuitry 150, and/or, more generally, the example process control development circuitry 110 of FIG. 1, may be implemented by hardware alone or by hardware in combination with software and/or firmware. Thus, for example, any of the example editor circuitry 120, the example process control deployment circuitry 130, the example import/export circuitry 135, the example repository management circuitry 145, the example difference visualizer circuitry 150, and/or, more generally, the example process control development circuitry 110, could be implemented by programmable circuitry in combination with machine readable instructions (e.g., firmware or software), processor circuitry, analog circuit(s), digital circuit(s), logic circuit(s), programmable processor(s), programmable microcontroller(s), graphics processing unit(s) (GPU(s)), digital signal processor(s) (DSP(s)), ASIC(s), programmable logic device(s) (PLD(s)), and/or field programmable logic device(s) (FPLD(s)) such as FPGAs. Further still, the example process control development circuitry 110 of FIG. 1 may include one or more elements, processes, and/or devices in addition to, or instead of, those illustrated in FIG. 1, and/or may include more than one of any or all of the illustrated elements, processes and devices.

Flowchart(s) representative of example machine readable instructions, which may be executed by programmable circuitry to implement and/or instantiate the process control development circuitry 110 of FIG. 1 and/or representative of example operations which may be performed by programmable circuitry to implement and/or instantiate the process control development circuitry 110 of FIG. 1, are shown in FIGS. 2, 3, 4, 5, and/or 6. The machine readable instructions may be one or more executable programs or portion(s) of one or more executable programs for execution by programmable circuitry such as the programmable circuitry 1212 shown in the example processor platform 1200 discussed below in connection with FIG. 12 and/or may be one or more function(s) or portion(s) of functions to be performed by the example programmable circuitry (e.g., an FPGA) discussed below in connection with FIGS. 13 and/or 14. In some examples, the machine readable instructions cause an operation, a task, etc., to be carried out and/or performed in an automated manner in the real world. As used herein, "automated" means without human involvement.

The program may be embodied in instructions (e.g., software and/or firmware) stored on one or more non-transitory computer readable and/or machine readable storage medium such as cache memory, a magnetic-storage device or disk (e.g., a floppy disk, a Hard Disk Drive (HDD), etc.), an optical-storage device or disk (e.g., a Blu-ray disk, a Compact Disk (CD), a Digital Versatile Disk (DVD), etc.), a Redundant Array of Independent Disks (RAID), a register, ROM, a solid-state drive (SSD), SSD memory, non-volatile memory (e.g., electrically erasable programmable read-only memory (EEPROM), flash memory, etc.), volatile memory (e.g., Random Access Memory (RAM) of any type, etc.), and/or any other storage device or storage disk. The instructions of the non-transitory computer readable and/or machine readable medium may program and/or be executed by programmable circuitry located in one or more hardware devices, but the entire program and/or parts thereof could alternatively be executed and/or instantiated by one or more hardware devices other than the programmable circuitry and/or embodied in dedicated hardware. The machine readable instructions may be distributed across multiple hardware devices and/or executed by two or more hardware devices (e.g., a server and a client hardware device). For example, the client hardware device may be implemented by an endpoint client hardware device (e.g., a hardware device associated with a human and/or machine user) or an intermediate client hardware device gateway (e.g., a radio access network (RAN)) that may facilitate communication between a server and an endpoint client hardware device. Similarly, the non-transitory computer readable storage medium may include one or more mediums. Further, although the example program is described with reference to the flowchart(s) illustrated in FIGS. 2, 3, 4, 5, and/or 6, many other methods of implementing the example process control development circuitry 110 may alternatively be used. For example, the order of execution of the blocks of the flowchart(s) may be changed, and/or some of the blocks described may be changed, eliminated, or combined. Additionally or alternatively, any or all of the blocks of the flow chart may be implemented by one or more hardware circuits (e.g., processor circuitry, discrete and/or integrated analog and/or digital circuitry, an FPGA, an ASIC, a comparator, an operational-amplifier (op-amp), a logic circuit, etc.) structured to perform the corresponding operation without executing software or firmware. The programmable circuitry may be distributed in different network locations and/or local to one or more hardware devices (e.g., a single-core processor (e.g., a single core CPU), a multi-core processor (e.g., a multi-core CPU, an XPU, etc.)). For example, the programmable circuitry may be a CPU and/or an FPGA located in the same package (e.g., the same integrated circuit (IC) package or in two or more separate housings), one or more processors in a single machine, multiple processors distributed across multiple servers of a server rack, multiple processors distributed across one or more server racks, etc., and/or any combination(s) thereof.

The machine readable instructions described herein may be stored in one or more of a compressed format, an encrypted format, a fragmented format, a compiled format, an executable format, a packaged format, etc. Machine readable instructions as described herein may be stored as data (e.g., computer-readable data, machine-readable data, one or more bits (e.g., one or more computer-readable bits, one or more machine-readable bits, etc.), a bitstream (e.g., a computer-readable bitstream, a machine-readable bitstream, etc.), etc.) or a data structure (e.g., as portion(s) of instructions, code, representations of code, etc.) that may be utilized to create, manufacture, and/or produce machine executable instructions. For example, the machine readable instructions may be fragmented and stored on one or more storage devices, disks and/or computing devices (e.g., servers) located at the same or different locations of a network or collection of networks (e.g., in the cloud, in edge devices, etc.). The machine readable instructions may require one or more of installation, modification, adaptation, updating, combining, supplementing, configuring, decryption, decompression, unpacking, distribution, reassignment, compilation, etc., in order to make them directly readable, interpretable, and/or executable by a computing device and/or other machine. For example, the machine readable instructions may be stored in multiple parts, which are individually compressed, encrypted, and/or stored on separate computing devices, wherein the parts when decrypted, decompressed, and/or combined form a set of computer-executable and/or machine executable instructions that implement one or more functions and/or operations that may together form a program such as that described herein.

In another example, the machine readable instructions may be stored in a state in which they may be read by programmable circuitry, but require addition of a library (e.g., a dynamic link library (DLL)), a software development kit (SDK), an application programming interface (API), etc., in order to execute the machine-readable instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, machine readable, computer readable and/or machine readable media, as used herein, may include instructions and/or program(s) regardless of the particular format or state of the machine readable instructions and/or program(s).

The machine readable instructions described herein can be represented by any past, present, or future instruction language, scripting language, programming language, etc. For example, the machine readable instructions may be represented using any of the following languages: C, C++, Java, C#, Perl, Python, JavaScript, HyperText Markup Language (HTML), Structured Query Language (SQL), Swift, etc.

As mentioned above, the example operations of FIGS. 2, 3, 4, 5, and/or 6 may be implemented using executable instructions (e.g., computer readable and/or machine readable instructions) stored on one or more non-transitory computer readable and/or machine readable media. As used herein, the terms non-transitory computer readable medium, non-transitory computer readable storage medium, non-transitory machine readable medium, and/or non-transitory machine readable storage medium are expressly defined to include any type of computer readable storage device and/or storage disk and to exclude propagating signals and to exclude transmission media. Examples of such non-transitory computer readable medium, non-transitory computer readable storage medium, non-transitory machine readable medium, and/or non-transitory machine readable storage medium include optical storage devices, magnetic storage devices, an HDD, a flash memory, a read-only memory (ROM), a CD, a DVD, a cache, a RAM of any type, a register, and/or any other storage device or storage disk in which information is stored for any duration (e.g., for extended time periods, permanently, for brief instances, for temporarily buffering, and/or for caching of the information). As used herein, the terms "non-transitory computer readable storage device" and "non-transitory machine readable storage device" are defined to include any physical (mechanical, magnetic and/or electrical) hardware to retain information for a time period, but to exclude propagating signals and to exclude transmission media. Examples of non-transitory computer readable storage devices and/or non-transitory machine readable storage devices include random access memory of any type, read only memory of any type, solid state memory, flash memory, optical discs, magnetic disks, disk drives, and/or redundant array of independent disks (RAID) systems. As used herein, the term "device" refers to physical structure such as mechanical and/or electrical equipment, hardware, and/or circuitry that may or may not be configured by computer readable instructions, machine readable instructions, etc., and/or manufactured to execute computer-readable instructions, machine-readable instructions, etc.

Figure 2:
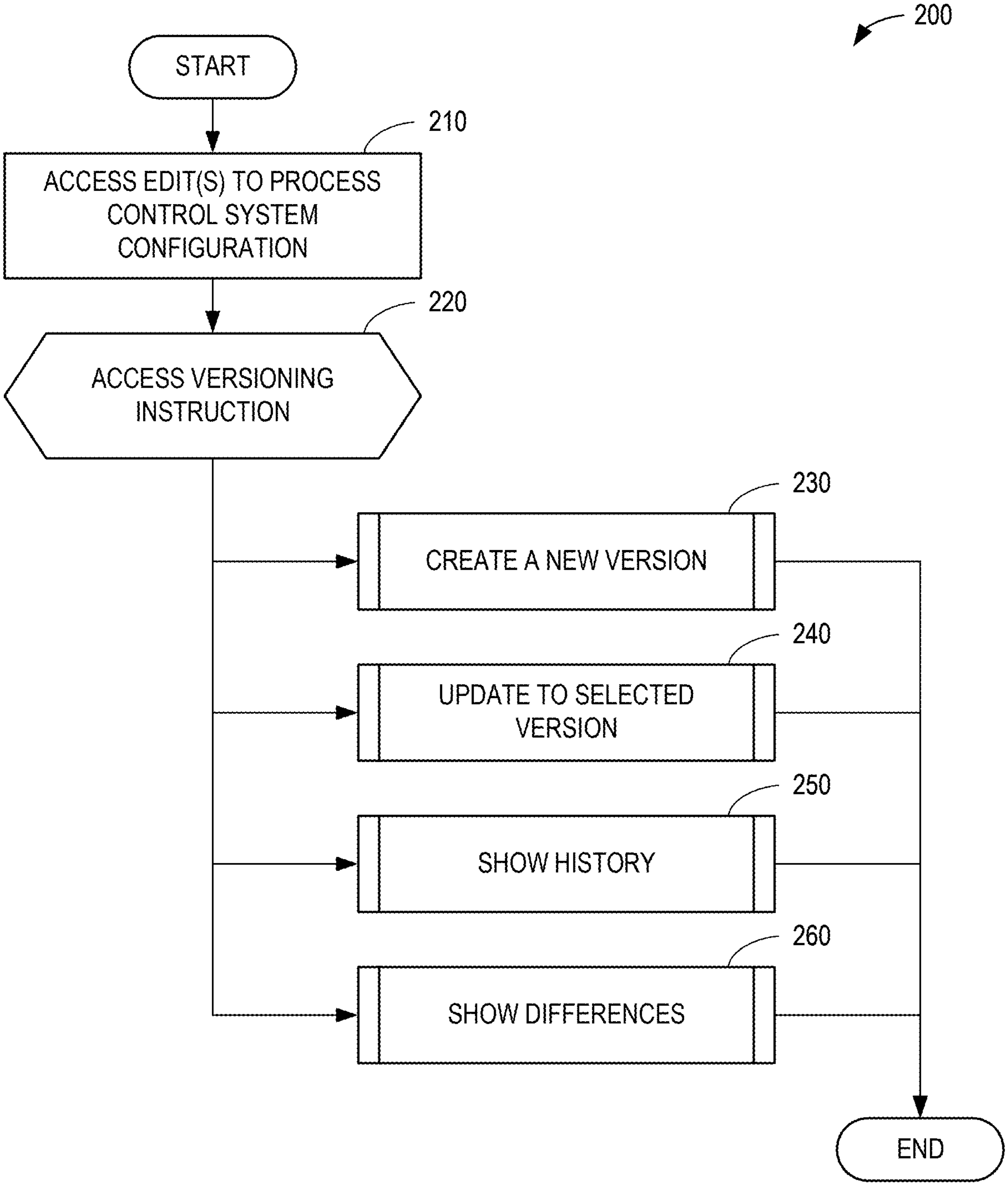
FIG. 2 is a flowchart representative of example machine readable instructions and/or example operations that may be executed, instantiated, and/or performed by example programmable circuitry to implement the process control development circuitry 110 of FIG. 1 to provide a graphical user interface development environment.

FIG. 2 is a flowchart representative of example machine readable instructions and/or example operations 200 that may be executed, instantiated, and/or performed by example programmable circuitry to implement the process control development circuitry 110 of FIG. 1 to provide a graphical user interface development environment. The example process 200 illustrated example of FIG. 2 begins in the example editor circuitry 120 presents a user interface by which a developer and/or the user may interact to edit a graphical user interface. The example editor circuitry 120 accesses such edits as input by the user and applies the edits to a process control system configuration stored in the display database 125. (Block 210).

When operating the editor circuitry 120, a developer may provide a versioning instruction to the process control development circuitry 110. The example editor circuitry 120 accesses the versioning instruction. (Block 220). In the illustrated example of FIG. 2, the versioning instruction may direct the process control development circuitry 110 to create a new version, to update to a selected version, to show version history, or to show differences between two or more select versions. While four such examples of versioning instructions are provided in the illustrated example of FIG. 2, many other types of versioning instructions may also be accessible to the developer.

In response to detecting a versioning instruction to create a new version, the example editor circuitry 120 initiates creation of the new version. (Block 230). An example approach to creating a new version is described below in connection with FIG. 3.

In response detection of a versioning instruction to update to a selected version, the example editor circuitry 120 initiates the update to the selected version. (Block 240). An example approach to updating to a selected version is described below in connection with FIG. 4.

In response to detecting a versioning instruction to show a version history, the example editor circuitry 120 initiates the display of the version history. (Block 250). An example approach to showing a version history is described below in connection with FIG. 5.

In response to detecting a versioning instruction to show differences between two or more versions, the example editor circuitry 120 initiates the display of differences between the two or more versions. (Block 260). An example approach to causing the display of differences between two or more versions is described below in connection with FIG. 6.

FIG. 3 is a flowchart representative of example machine readable instructions and/or example operations that may be executed, instantiated, and/or performed by example programmable circuitry to implement the process control development circuitry 110 of FIG. 1 to create a new version at the remote repository of FIG. 1. The example process 230 of the illustrated example of FIG. 3 begins in response to a developer instruction provided to the editor circuitry 120 to create a new version.

In some examples, the developer instruction may be provided by the developer clicking a button within a user interface of the editor circuitry 120. The example editor circuitry 120 presents a dialogue to the user requesting user commit information. (Block 310). In examples disclosed herein, the user commit information may include developer comments about the new version that is being created and/or any other information relevant to the new version. Such information may include, for example, a username of the developer that requested the new version, a timestamp at which the new version request was received, etc. In some examples, the username of the developer may be a username provided within the process control development circuitry 110 (e.g., a username of a local instance of an application executed on a desktop computer, as opposed to a logged-on username of the computer such as a Microsoft Windows user identifier, such as an Operating System (OS) user). The example repository management circuitry 145 accesses the user commit information. (Block 320). The user commit information will later be used when creating the new version with the remote repository 170.

The example import/export circuitry 135 exports information from the display database 125 to the local repository 140. (Block 330). In some examples, the information is transformed from records within the display database 125 (e.g., one or more records in a SQL database table), to a file structure within the local repository 140. For example, a table and/or other object within the display database 125 may be represented as an extensible markup language (XML) file when stored in the local repository 140. In this manner, the local repository 140 may include a plurality of files that correspond to respective objects within the display database 125.

The example repository management circuitry 145 then commits the exported files within the local repository 140. (Block 340). The example repository management circuitry 145 pushes the locally committed version to the remote repository 170 with the user commit information. (Block 350). The example process 230 of the illustrated example of FIG. 3 then terminates, but may be performed again upon a subsequent instruction from a developer to create a new version.

FIG. 4 is a flowchart representative of example machine readable instructions and/or example operations that may be executed, instantiated, and/or performed by example programmable circuitry to implement the process control development circuitry 110 of FIG. 1 to update the process control development environment of FIG. 1 with a selected version from the remote repository of FIG. 1. The example process 240 of the illustrated example of FIG. 4 begins in response to a developer (e.g., a user) requesting an update to a selected version from the remote repository 170.

In some examples, the request to update to the selected version may occur after the developer has been presented with the version history and/or a display of differences between various versions. However, in some examples, the developer may simply request an update to the latest version that is stored in the remote repository 170.

The example repository management circuitry 145 pulls the selected version from the remote repository 170 to the local repository 140. (Block 410). In this manner, files are copied from the remote repository 170 to a corresponding file structure within the local repository 140. In some examples, files are copied individually from the remote repository 170 to the local repository 140. However, in some other examples, files associated with the selected version may be copied in bulk from the remote repository 170 to the local repository 140 (e.g., by way of a ZIP file and/or other approach to bulk transfer of multiple files).

The example repository management circuitry 145 causes the import/export circuitry 135 to import the files corresponding to the selected version from the local repository 140 to the display database 125. (Block 420). To do so, the example import/export circuitry 135 reads each of the files associated with the selected version from the local repository 140, and creates (and/or updates) corresponding data within the display database 125. In some examples, data is first removed from the display database 125 to ensure the imported data results in operation as expected.

Using the newly imported data stored in the display database 125, the example editor circuitry 120 causes display of a user interface. (Block 430). The user interface displayed by the editor circuitry 120 may then be edited by the developer. In some examples, the process control deployment circuitry 130 may be used to deploy executables and/or configurations 180 from the display database 125 to the process control system endpoint 190. The process control system endpoint 190 is, as a result, updated to the selected version.

FIG. 5 is a flowchart representative of example machine readable instructions and/or example operations that may be executed, instantiated, and/or performed by example programmable circuitry to implement the process control development circuitry 110 of FIG. 1 to show a version history. The example process 250 of the illustrated example of FIG. 5 begins in response to a developer requesting display of a version history. The example repository management circuitry 145 obtains version history information from the remote repository 170. (Block 510). The version history information includes information identifying version numbers, dates, user commit information, etc. associated with versions that have been committed to the remote repository 170. The example repository management circuitry 145 causes display of the version history information. (Block 520). In some examples, the version history information is displayed in a timeline format that enables a developer to identify chronological updates and/or other corresponding information. However, any other approach to visualizing a version history may additionally or alternatively be used.

Within the visualization of the version histories, the example repository management circuitry 145 enables the selection of two or more version histories for display of differences between the two or more selected version histories. To that end, the example repository management circuitry 145 identifies the selected version histories. (Block 530). The example repository management circuitry 145 causes the difference visualizer circuitry 150 to display a dialog and or other user interface that illustrates differences between the selected version histories. (Block 540). An example dialog showing differences between two selected versions is shown in connection with FIG. 11. In some examples disclosed herein, the difference visualizer circuitry 150 causes presentation of a first representation of the user interface corresponding to a first version, in visual proximity to a second representation of user interface corresponding to a second version (e.g., within a same dialog and/or same window within a graphical user interface). Causing presentation of two graphical representations of user interface enables the developer to quickly understand the differences between the displayed versions.

The example remote management circuitry 145 enables selection of a version to be pulled from the remote repository. (Block 550). Such selection may be made as part of display of the version history of block 520, or alternatively may be made as part of display of the differences between the two or more selected version histories of Block 540. Regardless of how such selection is made, the example repository management circuitry 145 enables the selection of the version so that the selected version may be imported to the display database 125 by the example import/export circuitry 135. Such selection may then be used in connection with the update process 240 described above in connection with FIG. 4.

FIG. 6 is a flowchart representative of example machine readable instructions and/or example operations that may be executed, instantiated, and/or performed by example programmable circuitry to implement the process control development circuitry 110 of FIG. 1 to show differences between versions in the version history. The example process 260 the illustrated example of FIG. 6 begins upon receipt of an instruction to show differences between two or more versions within a version history. In the illustrated example of FIG. 6, differences are displayed between two versions. However, displaying differences between more than two versions is also possible.

The example difference visualizer circuitry 150 identifies a first version and a second version to be compared. (Block 610). The example difference visualizer circuitry 150 causes the repository management circuitry 145 to pull the first version and the second version from the remote repository 170 to the local repository 140. (Block 620). The example difference visualizer circuitry 150 identifies files having the same filename present in both versions but having different content. (Block 630). Files having different content may be identified based on, for example, analysis of the their content, an analysis of the file size of the corresponding file(s), an analysis of a computed identifier (e.g., a hash) of the corresponding file(s), etc. The example difference visualizer circuitry 150 identifies a first file from the first version and a corresponding second file from the second version for display of the differences. (Block 640).

The example difference visualizer circuitry 150 causes display of textual differences between the first file and second file. (Block 650). An example approach to displaying textual differences between two files is illustrated below in connection with FIG. 11. For example, the textual contents of each file may be displayed in visual proximity of each other while highlighting portions that are different between each of the two files. In examples disclosed herein, highlighting is used to draw attentions to differences. However, any other visual technique for identifying content may additionally or alternatively be used including, for example, shading, outlining, overlays, callouts, annotations, etc.

The example difference visualizer circuitry 150 causes display of a first graphical representation of the first version. (Block 660). The difference visualizer circuitry 150 causes display of a second graphical representation of the second version. (Block 670). In some examples, the first or second graphical representation may be augmented with an annotation to draw the attention of a viewer to the difference between the first version and the second version. Displaying graphical representations of the version histories enables a developer to quickly discern between user interface(s) represented by the corresponding version(s). In some examples, the user may select a different file corresponding to each of the version histories for display of the differences between those two selected files. In such an example, control returns to block 640 where the additional file files are identified and displayed according to blocks 640 and 650.

Figure 7:
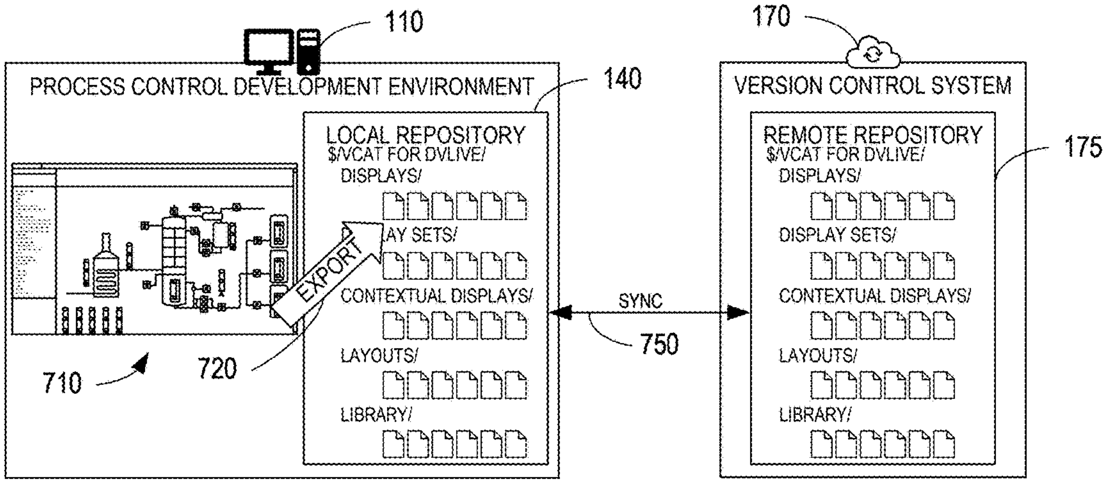
FIGS. 7-9 are diagrams illustrating an example progression through applying edits to a user interface and synchronizing the latest version of the interface to a version control system.
Figure 8:
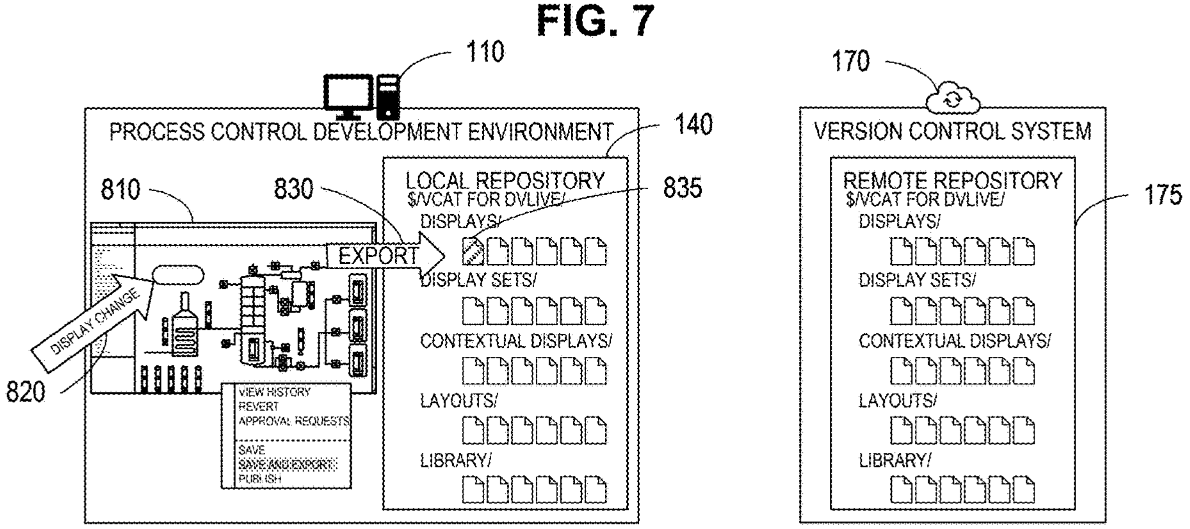
Figure 9:
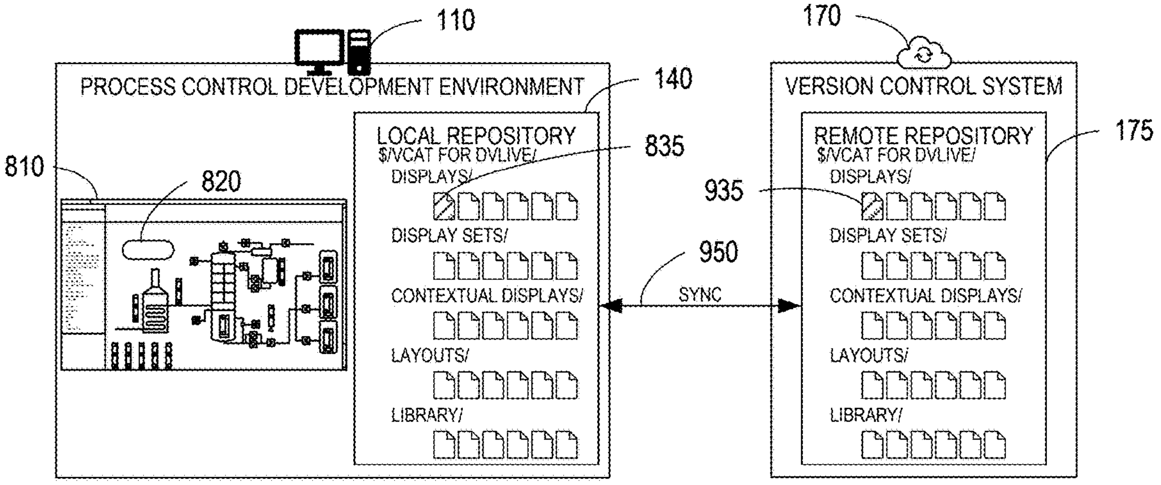

FIGS. 7-9 are diagrams illustrating an example progression through applying edits to a user interface and synchronizing the latest version of the interface to the version control system 175. In the illustrated example of FIG. 7 a first version 710 of a graphical user interface is being developed at the process control development environment 110. The developer determines that the first graphical user interface 710 should be used to form a new version in the version control system 175. Information corresponding to the first graphical user interface 710 is exported 720 to the local repository 140, and is then synchronized 750 to the remote repository 170.

In the illustrated example of FIG. 8, a change is made to create a second version 810 of the graphical user interface. The example change includes addition of a button 820 in the second version 810 of the graphical user interface. The second version 810 of the graphical user interface is exported 830 to the local repository 140. In the illustrated example of FIG. 8 the addition of the button 820 results in the change to a file 835 within the local repository 140. While the file 835 is updated in the local repository 140, the new version of the file 835 has not yet been committed (e.g., synchronized) to the version control system 175 and/or the remote repository 170.

In the illustrated example of FIG. 9, the updated file 835 is synchronized 950 to the version control system 175. In this manner, the corresponding updated file 935 is stored in the remote repository 170. Developers may then subsequently pull this latest version from the version control system 175 for development on their local process control development environment 110.

Figure 10:
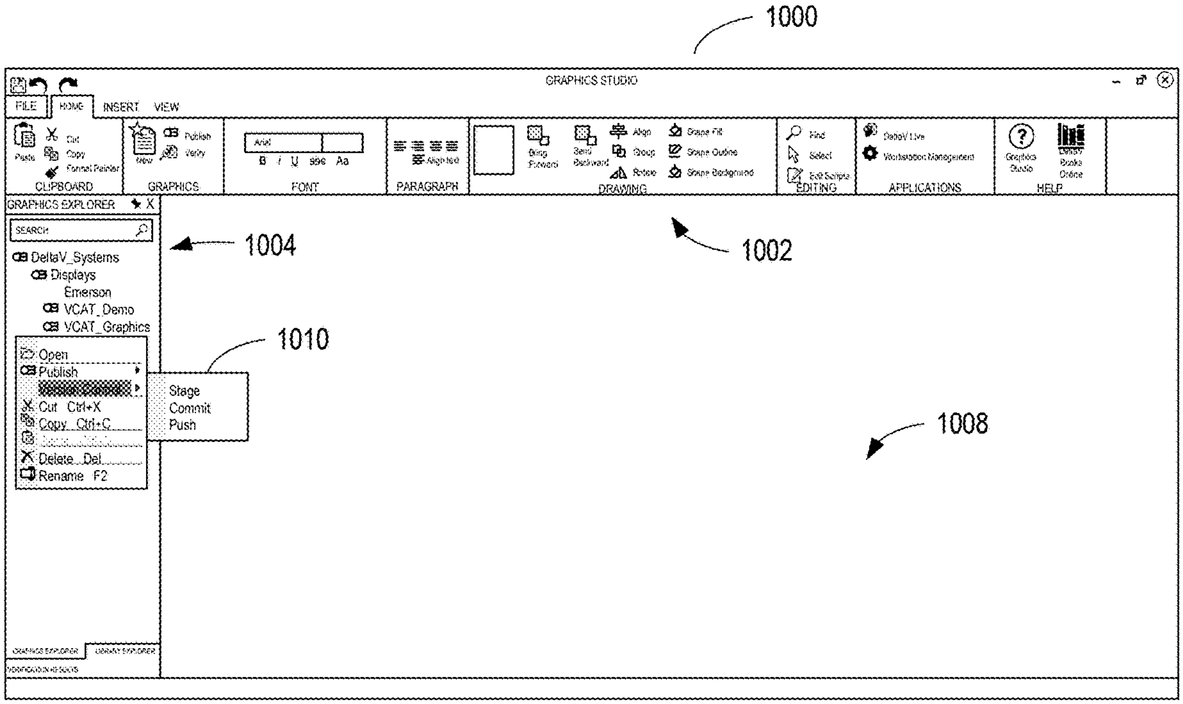
FIG. 10 is an example user interface that may be displayed by the example editor circuitry of FIG. 1.

FIG. 10 is an example user interface 1000 that may be displayed by the example editor circuitry of FIG. 1. The example interface 1000 of FIG. 10 includes a ribbon 1002, a side-bar 1004, and a main editing window 1008. Within the side-bar 1004, the user may click on one or more objects and cause presentation of a version control menu 1010.

In the illustrated example of FIG. 10, the ribbon 1002 includes one or more user interface objects that are usable by the developer to apply edits to a graphical user interface presented in the main window 1008. In the illustrated example of FIG. 10, a ribbon is used to arrange the one or more user interface objects. However, any other approach to visually arranging user interface objects including, for example, menus, pallets, etc. may additionally or alternatively be used.

In the illustrated example of FIG. 10, the side-bar 1004 enables the identification of design elements of the user interface being designed. The side-bar 1004 is illustrated as docked to the left-most side of the user interface in FIG. 10. However, the side-bar 1004 may be presented in any other configuration and/or might not be displayed in a side-bar arrangement. Within the side-bar 1004, the user may access a version control menu 1010. However, in some examples, the version control menu 1010 is accessible elsewhere (e.g., via the ribbon 1002, by right-clicking in the main window 1008, etc.).

Figure 11:
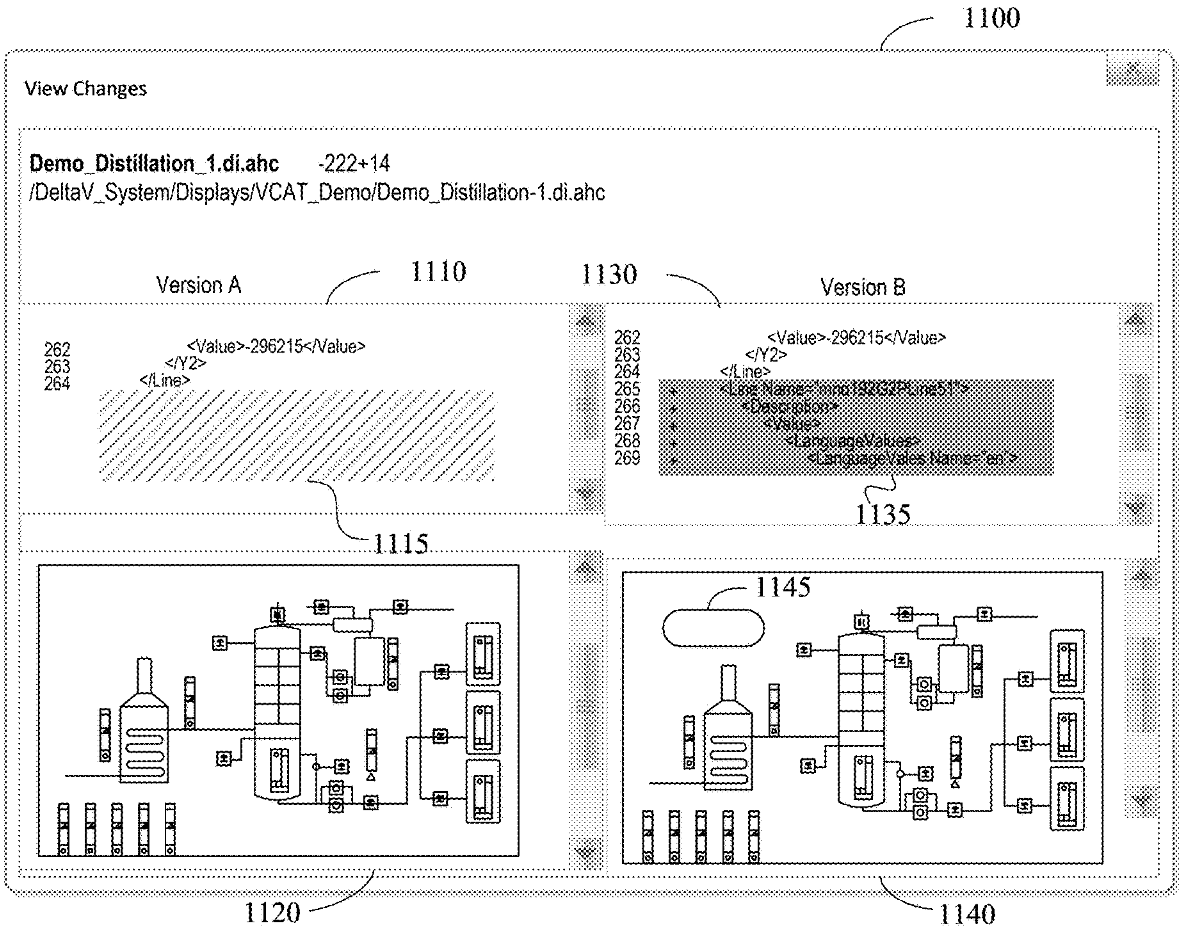
FIG. 11 is an example user interface that may be displayed by the example difference visualizer circuitry of FIG. 1 to show differences between versions in the version history.

FIG. 11 is an example user interface 1100 that may be displayed by the example difference visualizer circuitry 150 of FIG. 1 to show differences between versions in the version history. In the illustrated example of FIG. 11, the user interface 1100 includes four panels 1110, 1120, 1130, 1140 arranged into four quadrants. However, the panels may additionally or alternatively be arranged in any other configuration. The first panel 1110 and the second panel 1120 correspond to a first version being compared by the example difference visualizer circuitry 150. The third panel 1130 and the fourth panel 1140 correspond to a second version being compared by the example difference visualizer circuitry 150.

The first panel 1110 displays a textual version of a file within the first version, and the third panel 1130 displays a textual version of a file within the second version. In the illustrated example of FIG. 11 differences 1115, 1135 are highlighted between the first panel 1110 and the third panel 1130. For example, a first difference 1115 in the first panel 1110 shows strikethroughs representing lines of code that do not appear in the file within the first version presented in the first panel, but do appear in the file within the second version presented in the second panel 1130. Likewise, a second difference 1135 illustrates those lines of code added to the file within the second version, as presented in the second panel 1130.

The second panel 1120 displays a first graphic corresponding to the first version, while the fourth panel 1140 displays a second graphic corresponding to the second version. In the illustrated example of FIG. 11, a graphical object 1145 that is added in the second version is shown. In some examples, additional annotations and/or visual markers may be added to the second panel 1120 and/or the fourth panel 1140 to draw a developers attention to differences between the first and second graphics.

Figure 12:
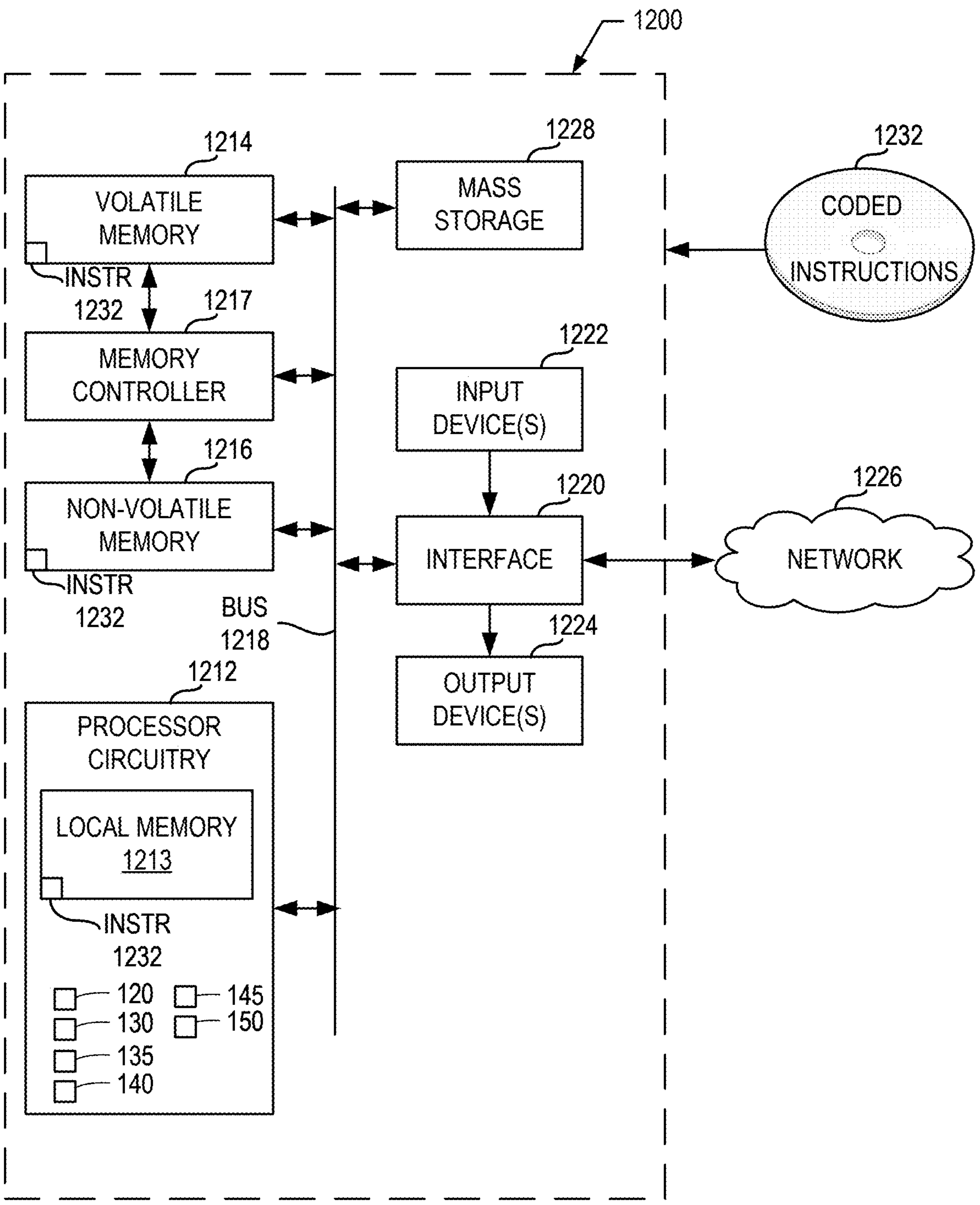
FIG. 12 is a block diagram of an example processing platform including programmable circuitry structured to execute, instantiate, and/or perform the example machine readable instructions and/or perform the example operations of FIGS. 2, 3, 4, 5, and/or 6 to implement the process control development circuitry 110 of FIG. 1.

FIG. 12 is a block diagram of an example programmable circuitry platform 1200 structured to execute and/or instantiate the example machine-readable instructions and/or the example operations of FIGS. 2, 3, 4, 5, and/or 6 to implement the process control development circuitry 110 of FIG. 1. The programmable circuitry platform 1200 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, a headset (e.g., an augmented reality (AR) headset, a virtual reality (VR) headset, etc.) or other wearable device, or any other type of computing and/or electronic device.

The programmable circuitry platform 1200 of the illustrated example includes programmable circuitry 1212. The programmable circuitry 1212 of the illustrated example is hardware. For example, the programmable circuitry 1212 can be implemented by one or more integrated circuits, logic circuits, FPGAs, microprocessors, CPUs, GPUs, DSPs, and/or microcontrollers from any desired family or manufacturer. The programmable circuitry 1212 may be implemented by one or more semiconductor based (e.g., silicon based) devices. In this example, the programmable circuitry 1212 implements the example editor circuitry 120, the example process control deployment circuitry 130, the example import/export circuitry 135, the example repository management circuitry 145, and the example difference visualizer circuitry 150.

The programmable circuitry 1212 of the illustrated example includes a local memory 1213 (e.g., a cache, registers, etc.). The programmable circuitry 1212 of the illustrated example is in communication with main memory 1214, 1216, which includes a volatile memory 1214 and a non-volatile memory 1216, by a bus 1218. The volatile memory 1214 may be implemented by Synchronous Dynamic Random Access Memory (SDRAM), Dynamic Random Access Memory (DRAM), RAMBUS® Dynamic Random Access Memory (RDRAM®), and/or any other type of RAM device. The non-volatile memory 1216 may be implemented by flash memory and/or any other desired type of memory device. Access to the main memory 1214, 1216 of the illustrated example is controlled by a memory controller 1217. In some examples, the memory controller 1217 may be implemented by one or more integrated circuits, logic circuits, microcontrollers from any desired family or manufacturer, or any other type of circuitry to manage the flow of data going to and from the main memory 1214, 1216.

The programmable circuitry platform 1200 of the illustrated example also includes interface circuitry 1220. The interface circuitry 1220 may be implemented by hardware in accordance with any type of interface standard, such as an Ethernet interface, a universal serial bus (USB) interface, a Bluetooth® interface, a near field communication (NFC) interface, a Peripheral Component Interconnect (PCI) interface, and/or a Peripheral Component Interconnect Express (PCIe) interface.

In the illustrated example, one or more input devices 1222 are connected to the interface circuitry 1220. The input device(s) 1222 permit(s) a user (e.g., a human user, a machine user, etc.) to enter data and/or commands into the programmable circuitry 1212. The input device(s) 1222 can be implemented by, for example, an audio sensor, a microphone, a camera (still or video), a keyboard, a button, a mouse, a touchscreen, a trackpad, a trackball, an isopoint device, and/or a voice recognition system.

One or more output devices 1224 are also connected to the interface circuitry 1220 of the illustrated example. The output device(s) 1224 can be implemented, for example, by display devices (e.g., a light emitting diode (LED), an organic light emitting diode (OLED), a liquid crystal display (LCD), a cathode ray tube (CRT) display, an in-place switching (IPS) display, a touchscreen, etc.), a tactile output device, a printer, and/or speaker. The interface circuitry 1220 of the illustrated example, thus, typically includes a graphics driver card, a graphics driver chip, and/or graphics processor circuitry such as a GPU.

The interface circuitry 1220 of the illustrated example also includes a communication device such as a transmitter, a receiver, a transceiver, a modem, a residential gateway, a wireless access point, and/or a network interface to facilitate exchange of data with external machines (e.g., computing devices of any kind) by a network 1226. The communication can be by, for example, an Ethernet connection, a digital subscriber line (DSL) connection, a telephone line connection, a coaxial cable system, a satellite system, a beyond-line-of-sight wireless system, a line-of-sight wireless system, a cellular telephone system, an optical connection, etc.

The programmable circuitry platform 1200 of the illustrated example also includes one or more mass storage discs or devices 1228 to store firmware, software, and/or data. Examples of such mass storage discs or devices 1228 include magnetic storage devices (e.g., floppy disk, drives, HDDs, etc.), optical storage devices (e.g., Blu-ray disks, CDs, DVDs, etc.), RAID systems, and/or solid-state storage discs or devices such as flash memory devices and/or SSDs.

The machine readable instructions 1232, which may be implemented by the machine readable instructions of FIGS. 2, 3, 4, 5, and/or 6, may be stored in the mass storage device 1228, in the volatile memory 1214, in the non-volatile memory 1216, and/or on at least one non-transitory computer readable storage medium such as a CD or DVD which may be removable.

Figure 13:
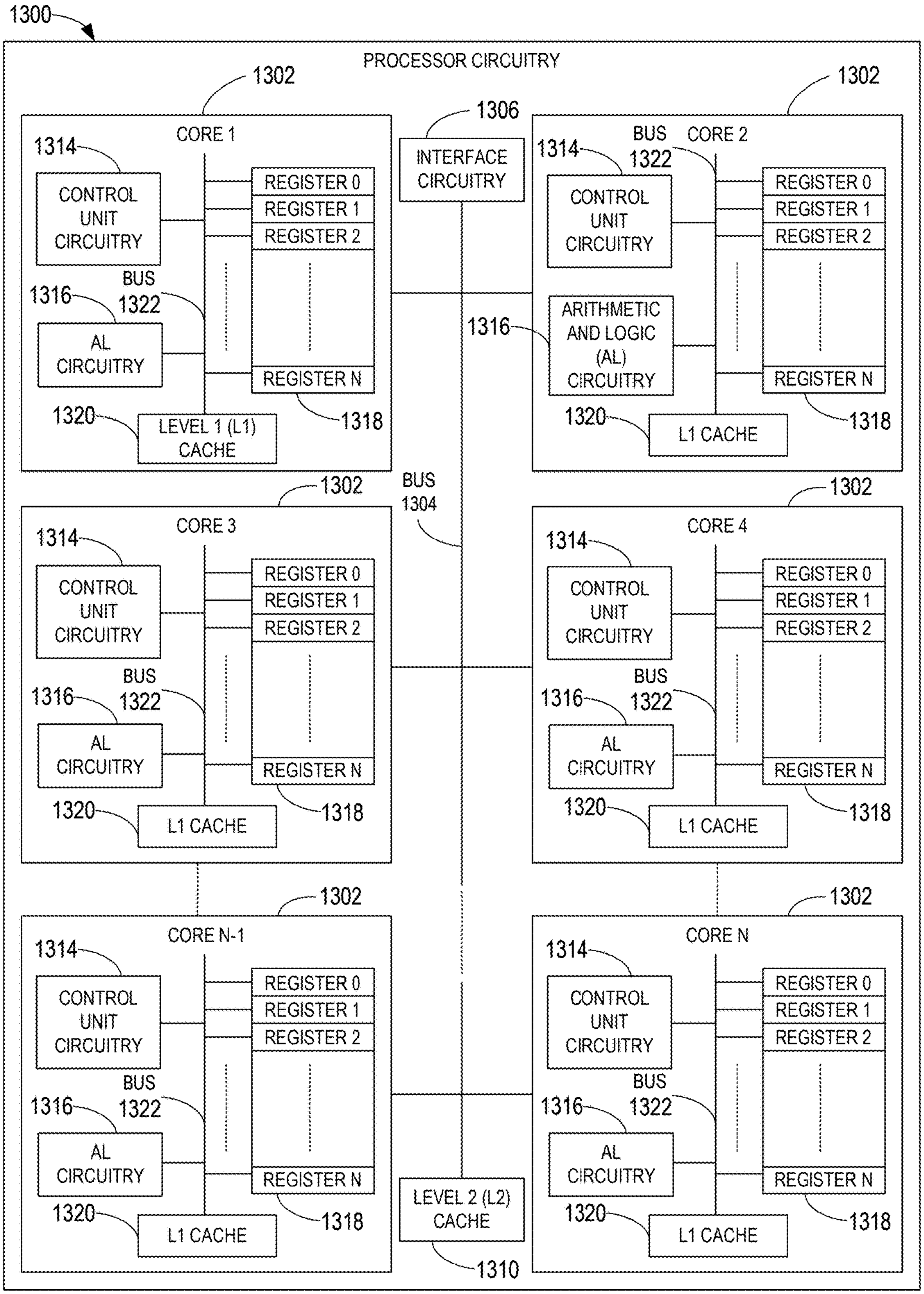
FIG. 13 is a block diagram of an example implementation of the programmable circuitry of FIG. 12.

FIG. 13 is a block diagram of an example implementation of the programmable circuitry 1212 of FIG. 12. In this example, the programmable circuitry 1212 of FIG. 12 is implemented by a microprocessor 1300. For example, the microprocessor 1300 may be a general-purpose microprocessor (e.g., general-purpose microprocessor circuitry). The microprocessor 1300 executes some or all of the machine-readable instructions of the flowcharts of FIGS. 2, 3, 4, 5, and/or 6 to effectively instantiate the circuitry of FIG. 2 as logic circuits to perform operations corresponding to those machine readable instructions. In some such examples, the circuitry of FIG. 1 is instantiated by the hardware circuits of the microprocessor 1300 in combination with the machine-readable instructions. For example, the microprocessor 1300 may be implemented by multi-core hardware circuitry such as a CPU, a DSP, a GPU, an XPU, etc. Although it may include any number of example cores 1302 (e.g., 1 core), the microprocessor 1300 of this example is a multi-core semiconductor device including N cores. The cores 1302 of the microprocessor 1300 may operate independently or may cooperate to execute machine readable instructions. For example, machine code corresponding to a firmware program, an embedded software program, or a software program may be executed by one of the cores 1302 or may be executed by multiple ones of the cores 1302 at the same or different times. In some examples, the machine code corresponding to the firmware program, the embedded software program, or the software program is split into threads and executed in parallel by two or more of the cores 1302. The software program may correspond to a portion or all of the machine readable instructions and/or operations represented by the flowcharts of FIGS. 2, 3, 4, 5, and/or 6.

The cores 1302 may communicate by a first example bus 1304. In some examples, the first bus 1304 may be implemented by a communication bus to effectuate communication associated with one(s) of the cores 1302. For example, the first bus 1304 may be implemented by at least one of an Inter-Integrated Circuit (I2C) bus, a Serial Peripheral Interface (SPI) bus, a PCI bus, or a PCIe bus. Additionally or alternatively, the first bus 1304 may be implemented by any other type of computing or electrical bus. The cores 1302 may obtain data, instructions, and/or signals from one or more external devices by example interface circuitry 1306. The cores 1302 may output data, instructions, and/or signals to the one or more external devices by the interface circuitry 1306. Although the cores 1302 of this example include example local memory 1320 (e.g., Level 1 (L1) cache that may be split into an L1 data cache and an L1 instruction cache), the microprocessor 1300 also includes example shared memory 1310 that may be shared by the cores (e.g., Level 2 (L2 cache)) for high-speed access to data and/or instructions. Data and/or instructions may be transferred (e.g., shared) by writing to and/or reading from the shared memory 1310. The local memory 1320 of each of the cores 1302 and the shared memory 1310 may be part of a hierarchy of storage devices including multiple levels of cache memory and the main memory (e.g., the main memory 1214, 1216 of FIG. 12). Typically, higher levels of memory in the hierarchy exhibit lower access time and have smaller storage capacity than lower levels of memory. Changes in the various levels of the cache hierarchy are managed (e.g., coordinated) by a cache coherency policy.

Each core 1302 may be referred to as a CPU, DSP, GPU, etc., or any other type of hardware circuitry. Each core 1302 includes control unit circuitry 1314, arithmetic and logic (AL) circuitry (sometimes referred to as an ALU) 1316, a plurality of registers 1318, the local memory 1320, and a second example bus 1322. Other structures may be present. For example, each core 1302 may include vector unit circuitry, single instruction multiple data (SIMD) unit circuitry, load/store unit (LSU) circuitry, branch/jump unit circuitry, floating-point unit (FPU) circuitry, etc. The control unit circuitry 1314 includes semiconductor-based circuits structured to control (e.g., coordinate) data movement within the corresponding core 1302. The AL circuitry 1316 includes semiconductor-based circuits structured to perform one or more mathematic and/or logic operations on the data within the corresponding core 1302. The AL circuitry 1316 of some examples performs integer based operations. In other examples, the AL circuitry 1316 also performs floating-point operations. In yet other examples, the AL circuitry 1316 may include first AL circuitry that performs integer-based operations and second AL circuitry that performs floating-point operations. In some examples, the AL circuitry 1316 may be referred to as an Arithmetic Logic Unit (ALU).

The registers 1318 are semiconductor-based structures to store data and/or instructions such as results of one or more of the operations performed by the AL circuitry 1316 of the corresponding core 1302. For example, the registers 1318 may include vector register(s), SIMD register(s), general-purpose register(s), flag register(s), segment register(s), machine-specific register(s), instruction pointer register(s), control register(s), debug register(s), memory management register(s), machine check register(s), etc. The registers 1318 may be arranged in a bank as shown in FIG. 13. Alternatively, the registers 1318 may be organized in any other arrangement, format, or structure, such as by being distributed throughout the core 1302 to shorten access time. The second bus 1322 may be implemented by at least one of an I2C bus, a SPI bus, a PCI bus, or a PCIe bus.

Each core 1302 and/or, more generally, the microprocessor 1300 may include additional and/or alternate structures to those shown and described above. For example, one or more clock circuits, one or more power supplies, one or more power gates, one or more cache home agents (CHAs), one or more converged/common mesh stops (CMSs), one or more shifters (e.g., barrel shifter(s)) and/or other circuitry may be present. The microprocessor 1300 is a semiconductor device fabricated to include many transistors interconnected to implement the structures described above in one or more integrated circuits (ICs) contained in one or more packages.

The microprocessor 1300 may include and/or cooperate with one or more accelerators (e.g., acceleration circuitry, hardware accelerators, etc.). In some examples, accelerators are implemented by logic circuitry to perform certain tasks more quickly and/or efficiently than can be done by a general-purpose processor. Examples of accelerators include ASICs and FPGAs such as those discussed herein. A GPU, DSP and/or other programmable device can also be an accelerator. Accelerators may be on-board the microprocessor 1300, in the same chip package as the microprocessor 1300 and/or in one or more separate packages from the microprocessor 1300.

Figure 14:
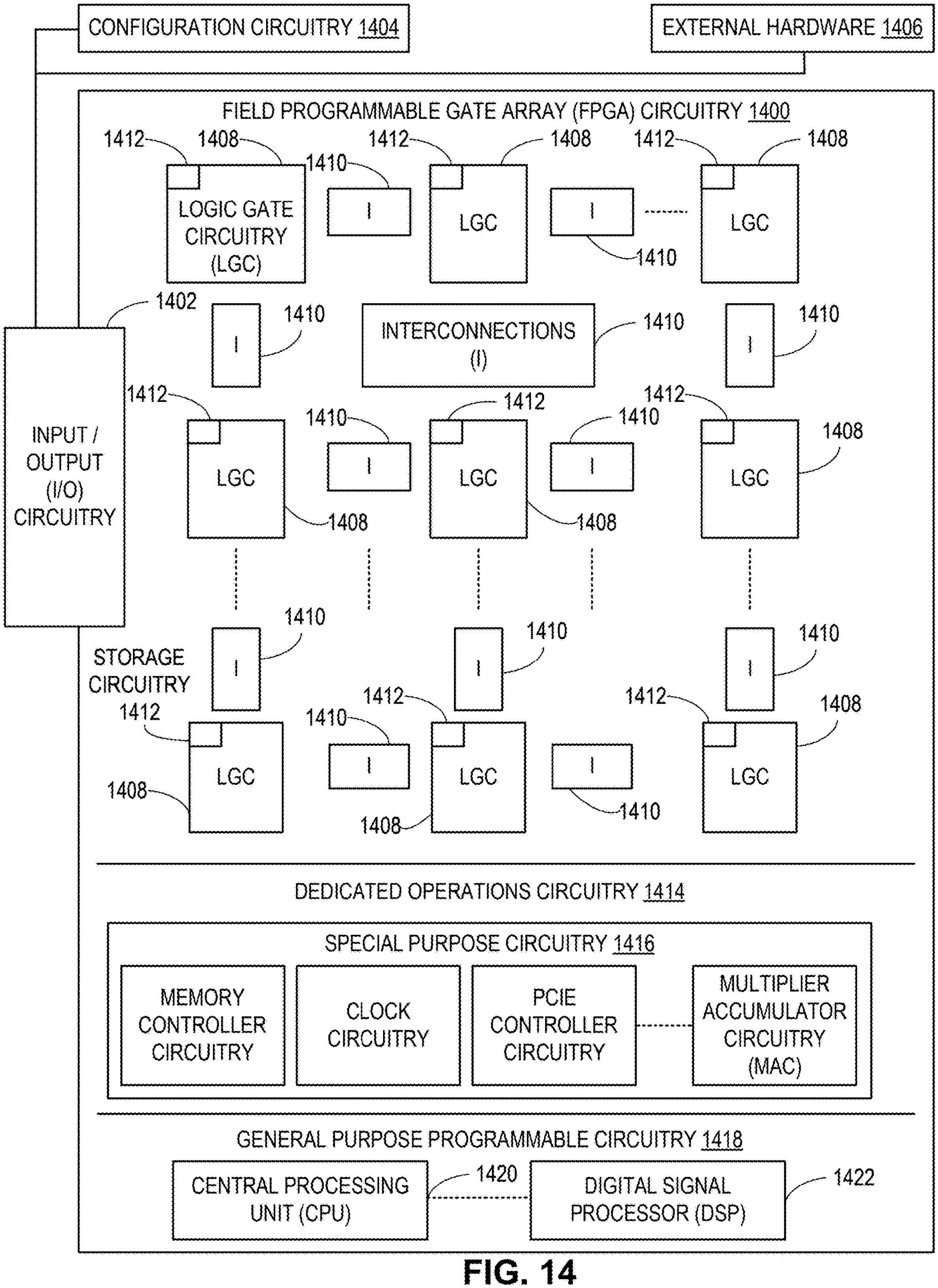
FIG. 14 is a block diagram of another example implementation of the programmable circuitry of FIG. 12.

FIG. 14 is a block diagram of another example implementation of the programmable circuitry 1212 of FIG. 12. In this example, the programmable circuitry 1212 is implemented by FPGA circuitry 1400. For example, the FPGA circuitry 1400 may be implemented by an FPGA. The FPGA circuitry 1400 can be used, for example, to perform operations that could otherwise be performed by the example microprocessor 1300 of FIG. 13 executing corresponding machine readable instructions. However, once configured, the FPGA circuitry 1400 instantiates the operations and/or functions corresponding to the machine readable instructions in hardware and, thus, can often execute the operations/functions faster than they could be performed by a general-purpose microprocessor executing the corresponding software.

More specifically, in contrast to the microprocessor 1300 of FIG. 13 described above (which is a general purpose device that may be programmed to execute some or all of the machine readable instructions represented by the flowchart(s) of FIGS. 2, 3, 4, 5, and/or 6 but whose interconnections and logic circuitry are fixed once fabricated), the FPGA circuitry 1400 of the example of FIG. 14 includes interconnections and logic circuitry that may be configured, structured, programmed, and/or interconnected in different ways after fabrication to instantiate, for example, some or all of the operations/functions corresponding to the machine readable instructions represented by the flowchart(s) of FIGS. 2, 3, 4, 5, and/or 6. In particular, the FPGA circuitry 1400 may be thought of as an array of logic gates, interconnections, and switches. The switches can be programmed to change how the logic gates are interconnected by the interconnections, effectively forming one or more dedicated logic circuits (unless and until the FPGA circuitry 1400 is reprogrammed). The configured logic circuits enable the logic gates to cooperate in different ways to perform different operations on data received by input circuitry. Those operations may correspond to some or all of the instructions (e.g., the software and/or firmware) represented by the flowchart(s) of FIGS. 2, 3, 4, 5, and/or 6. As such, the FPGA circuitry 1400 may be configured and/or structured to effectively instantiate some or all of the operations/functions corresponding to the machine readable instructions of the flowchart(s) of FIGS. 2, 3, 4, 5, and/or 6 as dedicated logic circuits to perform the operations/functions corresponding to those software instructions in a dedicated manner analogous to an ASIC. Therefore, the FPGA circuitry 1400 may perform the operations/functions corresponding to the some or all of the machine readable instructions of FIGS. 2, 3, 4, 5, and/or 6 faster than the general-purpose microprocessor can execute the same.

In the example of FIG. 14, the FPGA circuitry 1400 is configured and/or structured in response to being programmed (and/or reprogrammed one or more times) based on a binary file. In some examples, the binary file may be compiled and/or generated based on instructions in a hardware description language (HDL) such as Lucid, Very High Speed Integrated Circuits (VHSIC) Hardware Description Language (VHDL), or Verilog. For example, a user (e.g., a human user, a machine user, etc.) may write code or a program corresponding to one or more operations/functions in an HDL; the code/program may be translated into a low-level language as needed; and the code/program (e.g., the code/program in the low-level language) may be converted (e.g., by a compiler, a software application, etc.) into the binary file. In some examples, the FPGA circuitry 1400 of FIG. 14 may access and/or load the binary file to cause the FPGA circuitry 1400 of FIG. 14 to be configured and/or structured to perform the one or more operations/functions. For example, the binary file may be implemented by a bit stream (e.g., one or more computer-readable bits, one or more machine-readable bits, etc.), data (e.g., computer-readable data, machine-readable data, etc.), and/or machine-readable instructions accessible to the FPGA circuitry 1400 of FIG. 14 to cause configuration and/or structuring of the FPGA circuitry 1400 of FIG. 14, or portion(s) thereof.

In some examples, the binary file is compiled, generated, transformed, and/or otherwise output from a uniform software platform utilized to program FPGAs. For example, the uniform software platform may translate first instructions (e.g., code or a program) that correspond to one or more operations/functions in a high-level language (e.g., C, C++, Python, etc.) into second instructions that correspond to the one or more operations/functions in an HDL. In some such examples, the binary file is compiled, generated, and/or otherwise output from the uniform software platform based on the second instructions. In some examples, the FPGA circuitry 1400 of FIG. 14 may access and/or load the binary file to cause the FPGA circuitry 1400 of FIG. 14 to be configured and/or structured to perform the one or more operations/functions. For example, the binary file may be implemented by a bit stream (e.g., one or more computer-readable bits, one or more machine-readable bits, etc.), data (e.g., computer-readable data, machine-readable data, etc.), and/or machine-readable instructions accessible to the FPGA circuitry 1400 of FIG. 14 to cause configuration and/or structuring of the FPGA circuitry 1400 of FIG. 14, or portion(s) thereof.

The FPGA circuitry 1400 of FIG. 14, includes example input/output (I/O) circuitry 1402 to obtain and/or output data to/from example configuration circuitry 1404 and/or external hardware 1406. For example, the configuration circuitry 1404 may be implemented by interface circuitry that may obtain a binary file, which may be implemented by a bit stream, data, and/or machine-readable instructions, to configure the FPGA circuitry 1400, or portion(s) thereof. In some such examples, the configuration circuitry 1404 may obtain the binary file from a user, a machine (e.g., hardware circuitry (e.g., programmable or dedicated circuitry) that may implement an Artificial Intelligence/Machine Learning (AI/ML) model to generate the binary file), etc., and/or any combination(s) thereof). In some examples, the external hardware 1406 may be implemented by external hardware circuitry. For example, the external hardware 1406 may be implemented by the microprocessor 1300 of FIG. 13.

The FPGA circuitry 1400 also includes an array of example logic gate circuitry 1408, a plurality of example configurable interconnections 1410, and example storage circuitry 1412. The logic gate circuitry 1408 and the configurable interconnections 1410 are configurable to instantiate one or more operations/functions that may correspond to at least some of the machine readable instructions of FIGS. 2, 3, 4, 5, and/or 6 and/or other desired operations. The logic gate circuitry 1408 shown in FIG. 14 is fabricated in blocks or groups. Each block includes semiconductor-based electrical structures that may be configured into logic circuits. In some examples, the electrical structures include logic gates (e.g., And gates, Or gates, Nor gates, etc.) that provide basic building blocks for logic circuits. Electrically controllable switches (e.g., transistors) are present within each of the logic gate circuitry 1408 to enable configuration of the electrical structures and/or the logic gates to form circuits to perform desired operations/functions. The logic gate circuitry 1408 may include other electrical structures such as look-up tables (LUTs), registers (e.g., flip-flops or latches), multiplexers, etc.

The configurable interconnections 1410 of the illustrated example are conductive pathways, traces, vias, or the like that may include electrically controllable switches (e.g., transistors) whose state can be changed by programming (e.g., using an HDL instruction language) to activate or deactivate one or more connections between one or more of the logic gate circuitry 1408 to program desired logic circuits.

The storage circuitry 1412 of the illustrated example is structured to store result(s) of the one or more of the operations performed by corresponding logic gates. The storage circuitry 1412 may be implemented by registers or the like. In the illustrated example, the storage circuitry 1412 is distributed amongst the logic gate circuitry 1408 to facilitate access and increase execution speed.

The example FPGA circuitry 1400 of FIG. 14 also includes example dedicated operations circuitry 1414. In this example, the dedicated operations circuitry 1414 includes special purpose circuitry 1416 that may be invoked to implement commonly used functions to avoid the need to program those functions in the field. Examples of such special purpose circuitry 1416 include memory (e.g., DRAM) controller circuitry, PCIe controller circuitry, clock circuitry, transceiver circuitry, memory, and multiplier-accumulator circuitry. Other types of special purpose circuitry may be present. In some examples, the FPGA circuitry 1400 may also include example general purpose programmable circuitry 1418 such as an example CPU 1420 and/or an example DSP 1422. Other general purpose programmable circuitry 1418 may additionally or alternatively be present such as a GPU, an XPU, etc., that can be programmed to perform other operations.

Although FIGS. 13 and 14 illustrate two example implementations of the programmable circuitry 1212 of FIG. 12, many other approaches are contemplated. For example, FPGA circuitry may include an on-board CPU, such as one or more of the example CPU 1420 of FIG. 13. Therefore, the programmable circuitry 1212 of FIG. 12 may additionally be implemented by combining at least the example microprocessor 1300 of FIG. 13 and the example FPGA circuitry 1400 of FIG. 14. In some such hybrid examples, one or more cores 1302 of FIG. 13 may execute a first portion of the machine readable instructions represented by the flowchart(s) of FIGS. 2, 3, 4, 5, and/or 6 to perform first operation(s)/function(s), the FPGA circuitry 1400 of FIG. 14 may be configured and/or structured to perform second operation(s)/function(s) corresponding to a second portion of the machine readable instructions represented by the flowcharts of FIGS. 2, 3, 4, 5, and/or 6, and/or an ASIC may be configured and/or structured to perform third operation(s)/function(s) corresponding to a third portion of the machine readable instructions represented by the flowcharts of FIGS. 2, 3, 4, 5, and/or 6.

It should be understood that some or all of the circuitry of FIG. 1 may, thus, be instantiated at the same or different times. For example, same and/or different portion(s) of the microprocessor 1300 of FIG. 13 may be programmed to execute portion(s) of machine-readable instructions at the same and/or different times. In some examples, same and/or different portion(s) of the FPGA circuitry 1400 of FIG. 14 may be configured and/or structured to perform operations/functions corresponding to portion(s) of machine-readable instructions at the same and/or different times.

In some examples, some or all of the circuitry of FIG. 1 may be instantiated, for example, in one or more threads executing concurrently and/or in series. For example, the microprocessor 1300 of FIG. 13 may execute machine readable instructions in one or more threads executing concurrently and/or in series. In some examples, the FPGA circuitry 1400 of FIG. 14 may be configured and/or structured to carry out operations/functions concurrently and/or in series. Moreover, in some examples, some or all of the circuitry of FIG. 1 may be implemented within one or more virtual machines and/or containers executing on the microprocessor 1300 of FIG. 13.

In some examples, the programmable circuitry 1212 of FIG. 12 may be in one or more packages. For example, the microprocessor 1300 of FIG. 13 and/or the FPGA circuitry 1400 of FIG. 14 may be in one or more packages. In some examples, an XPU may be implemented by the programmable circuitry 1212 of FIG. 12, which may be in one or more packages. For example, the XPU may include a CPU (e.g., the microprocessor 1300 of FIG. 13, the CPU 1420 of FIG. 14, etc.) in one package, a DSP (e.g., the DSP 1422 of FIG. 14) in another package, a GPU in yet another package, and an FPGA (e.g., the FPGA circuitry 1400 of FIG. 14) in still yet another package.

Figure 15:
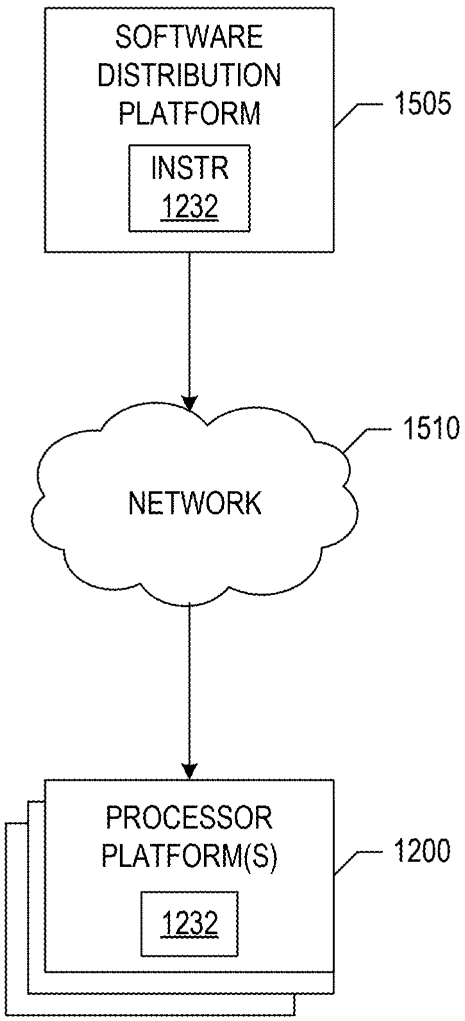
FIG. 15 is a block diagram of an example software/firmware/instructions distribution platform (e.g., one or more servers) to distribute software, instructions, and/or firmware (e.g., corresponding to the example machine readable instructions of FIGS. 2, 3, 4, 5, and/or 6) to client devices associated with end users and/or consumers (e.g., for license, sale, and/or use), retailers (e.g., for sale, re-sale, license, and/or sub-license), and/or original equipment manufacturers (OEMs) (e.g., for inclusion in products to be distributed to, for example, retailers and/or to other end users such as direct buy customers).

A block diagram illustrating an example software distribution platform 1505 to distribute software such as the example machine readable instructions 1232 of FIG. 12 to other hardware devices (e.g., hardware devices owned and/or operated by third parties from the owner and/or operator of the software distribution platform) is illustrated in FIG. 15. The example software distribution platform 1505 may be implemented by any computer server, data facility, cloud service, etc., capable of storing and transmitting software to other computing devices. The third parties may be customers of the entity owning and/or operating the software distribution platform 1505. For example, the entity that owns and/or operates the software distribution platform 1505 may be a developer, a seller, and/or a licensor of software such as the example machine readable instructions 1232 of FIG. 12. The third parties may be consumers, users, retailers, OEMs, etc., who purchase and/or license the software for use and/or re-sale and/or sub-licensing. In the illustrated example, the software distribution platform 1505 includes one or more servers and one or more storage devices. The storage devices store the machine readable instructions 1232, which may correspond to the example machine readable instructions of FIGS. 2, 3, 4, 5, and/or 6, as described above. The one or more servers of the example software distribution platform 1505 are in communication with an example network 1510, which may correspond to any one or more of the Internet and/or any of the example networks described above. In some examples, the one or more servers are responsive to requests to transmit the software to a requesting party as part of a commercial transaction. Payment for the delivery, sale, and/or license of the software may be handled by the one or more servers of the software distribution platform and/or by a third party payment entity. The servers enable purchasers and/or licensors to download the machine readable instructions 1232 from the software distribution platform 1505. For example, the software, which may correspond to the example machine readable instructions of FIGS. 2, 3, 4, 5, and/or 6, may be downloaded to the example programmable circuitry platform 1200, which is to execute the machine readable instructions 1232 to implement the process control development circuitry 110. In some examples, one or more servers of the software distribution platform 1505 periodically offer, transmit, and/or force updates to the software (e.g., the example machine readable instructions 1232 of FIG. 12) to ensure improvements, patches, updates, etc., are distributed and applied to the software at the end user devices. Although referred to as software above, the distributed "software" could alternatively be firmware.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc., may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, or (7) A with B and with C. As used herein in the context of describing structures, components, items, objects and/or things, the phrase "at least one of A and B" is intended to refer to implementations including any of (1) at least one A, (2) at least one B, or (3) at least one A and at least one B. Similarly, as used herein in the context of describing structures, components, items, objects and/or things, the phrase "at least one of A or B" is intended to refer to implementations including any of (1) at least one A, (2) at least one B, or (3) at least one A and at least one B. As used herein in the context of describing the performance or execution of processes, instructions, actions, activities, etc., the phrase "at least one of A and B" is intended to refer to implementations including any of (1) at least one A, (2) at least one B, or (3) at least one A and at least one B. Similarly, as used herein in the context of describing the performance or execution of processes, instructions, actions, activities, etc., the phrase "at least one of A or B" is intended to refer to implementations including any of (1) at least one A, (2) at least one B, or (3) at least one A and at least one B.

As used herein, singular references (e.g., "a", "an", "first", "second", etc.) do not exclude a plurality. The term "a" or "an" object, as used herein, refers to one or more of that object. The terms "a" (or "an"), "one or more", and "at least one" are used interchangeably herein. Furthermore, although individually listed, a plurality of means, elements, or actions may be implemented by, e.g., the same entity or object. Additionally, although individual features may be included in different examples or claims, these may possibly be combined, and the inclusion in different examples or claims does not imply that a combination of features is not feasible and/or advantageous.

As used herein, unless otherwise stated, the term "above" describes the relationship of two parts relative to Earth. A first part is above a second part, if the second part has at least one part between Earth and the first part. Likewise, as used herein, a first part is "below" a second part when the first part is closer to the Earth than the second part. As noted above, a first part can be above or below a second part with one or more of: other parts therebetween, without other parts therebetween, with the first and second parts touching, or without the first and second parts being in direct contact with one another.

As used in this patent, stating that any part (e.g., a layer, film, area, region, or plate) is in any way on (e.g., positioned on, located on, disposed on, or formed on, etc.) another part, indicates that the referenced part is either in contact with the other part, or that the referenced part is above the other part with one or more intermediate part(s) located therebetween.

As used herein, connection references (e.g., attached, coupled, connected, and joined) may include intermediate members between the elements referenced by the connection reference and/or relative movement between those elements unless otherwise indicated. As such, connection references do not necessarily infer that two elements are directly connected and/or in fixed relation to each other. As used herein, stating that any part is in "contact" with another part is defined to mean that there is no intermediate part between the two parts.

Unless specifically stated otherwise, descriptors such as "first," "second," "third," etc., are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly within the context of the discussion (e.g., within a claim) in which the elements might, for example, otherwise share a same name.

As used herein, "approximately" and "about" modify their subjects/values to recognize the potential presence of variations that occur in real world applications. For example, "approximately" and "about" may modify dimensions that may not be exact due to manufacturing tolerances and/or other real world imperfections as will be understood by persons of ordinary skill in the art. For example, "approximately" and "about" may indicate such dimensions may be within a tolerance range of +/−10% unless otherwise specified herein.

As used herein "substantially real time" refers to occurrence in a near instantaneous manner recognizing there may be real world delays for computing time, transmission, etc. Thus, unless otherwise specified, "substantially real time" refers to real time +1 second.

As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

As used herein, "programmable circuitry" is defined to include (i) one or more special purpose electrical circuits (e.g., an application specific circuit (ASIC)) structured to perform specific operation(s) and including one or more semiconductor-based logic devices (e.g., electrical hardware implemented by one or more transistors), and/or (ii) one or more general purpose semiconductor-based electrical circuits programmable with instructions to perform specific functions(s) and/or operation(s) and including one or more semiconductor-based logic devices (e.g., electrical hardware implemented by one or more transistors). Examples of programmable circuitry include programmable microprocessors such as Central Processor Units (CPUs) that may execute first instructions to perform one or more operations and/or functions, Field Programmable Gate Arrays (FPGAs) that may be programmed with second instructions to cause configuration and/or structuring of the FPGAs to instantiate one or more operations and/or functions corresponding to the first instructions, Graphics Processor Units (GPUs) that may execute first instructions to perform one or more operations and/or functions, Digital Signal Processors (DSPs) that may execute first instructions to perform one or more operations and/or functions, XPUs, Network Processing Units (NPUs) one or more microcontrollers that may execute first instructions to perform one or more operations and/or functions and/or integrated circuits such as Application Specific Integrated Circuits (ASICs). For example, an XPU may be implemented by a heterogeneous computing system including multiple types of programmable circuitry (e.g., one or more FPGAs, one or more CPUs, one or more GPUs, one or more NPUs, one or more DSPs, etc., and/or any combination(s) thereof), and orchestration technology (e.g., application programming interface(s) (API(s)) that may assign computing task(s) to whichever one(s) of the multiple types of programmable circuitry is/are suited and available to perform the computing task(s).

As used herein integrated circuit/circuitry is defined as one or more semiconductor packages containing one or more circuit elements such as transistors, capacitors, inductors, resistors, current paths, diodes, etc. For example, an integrated circuit may be implemented as one or more of an ASIC, an FPGA, a chip, a microchip, programmable circuitry, a semiconductor substrate coupling multiple circuit elements, a system on chip (SoC), etc.

From the foregoing, it will be appreciated that example systems, apparatus, articles of manufacture, and methods have been disclosed that enables version control in a process control system development environment. Disclosed systems, apparatus, articles of manufacture, and methods improve the efficiency of using a computing device by enabling multiple developers operating multiple process control development circuitries to work on a same graphical user interface within a version control system. Such an approach enables efficiency of development of graphical user interfaces for process control systems. Disclosed systems, apparatus, articles of manufacture, and methods are accordingly directed to one or more improvement(s) in the operation of a machine such as a computer or other electronic and/or mechanical device.

Example methods, apparatus, systems, and articles of manufacture to provide version control in a process control system development environment are disclosed herein. Further examples and combinations thereof include the following:

Example 1 includes at least one non-transitory machine-readable medium comprising machine-readable instructions to cause at least one processor circuit to at least cause presentation of a first graphical user interface to enable editing of a second graphical user interface of a process control system, the second graphical user interface based on information stored in a database, access a user instruction to modify the second graphical user interface from a first version to a second version, access user commit information associated with the second version, export the second version of the second graphical user interface from the database to a local file repository, and synchronize the second version from the local file repository to a remote repository, the synchronization to include the user commit information.

Example 2 includes the at least one non-transitory machine-readable medium of example 1, wherein the machine-readable instructions are to cause one or more of the at least one processor circuit to synchronize a third version of the second graphical user interface from the remote repository to the local file repository, import the third version of the second graphical user interface from the local file repository to the database, and cause presentation of the third version of the second graphical user interface for editing within the first graphical user interface.

Example 3 includes the at least one non-transitory machine-readable medium of example 1, wherein the machine-readable instructions are to cause one or more of the at least one processor circuit to cause presentation of a version history of versions of the second graphical user interface stored at the remote repository.

Example 4 includes the at least one non-transitory machine-readable medium of example 3, wherein the machine-readable instructions are to cause one or more of the at least one processor circuit to identify a difference between a first file of the second version of the second graphical user interface and a second file of a third version of the second graphical user interface, and cause display of a textual representation of the difference within the first graphical user interface.

Example 5 includes the at least one non-transitory machine-readable medium of example 4, wherein the machine-readable instructions are to cause one or more of the at least one processor circuit to cause display of a graphical representation of the difference in association with the first graphical user interface.

Example 6 includes the at least one non-transitory machine-readable medium of example 5, wherein the graphical representation of the difference includes a first portion representing the second version of the second graphical user interface and a second portion representing the third version of the second graphical user interface.

Example 7 includes the at least one non-transitory machine-readable medium of example 1, wherein the user commit information includes a username of a user that is logged into the first graphical user interface.

Example 8 includes an apparatus comprising interface circuitry, machine-readable instructions, and at least one processor circuit to be programmed by the machine-readable instructions to cause presentation of a first graphical user interface to enable editing of a second graphical user interface of a process control system, the second graphical user interface based on information stored in a database, access a user instruction to modify the second graphical user interface from a first version to a second version, access user commit information associated with the second version, export the second version of the second graphical user interface from the database to a local file repository, and synchronize the second version from the local file repository to a remote repository, the synchronization to include the user commit information.

Example 9 includes the apparatus of example 8, wherein one or more of the at least one processor circuit is to synchronize a third version of the second graphical user interface from the remote repository to the local file repository, import the third version of the second graphical user interface from the local file repository to the database, and cause presentation of the third version of the second graphical user interface for editing within the first graphical user interface.

Example 10 includes the apparatus of example 8, wherein one or more of the at least one processor circuit is to cause presentation of a version history of versions of the second graphical user interface stored at the remote repository.

Example 11 includes the apparatus of example 10, wherein one or more of the at least one processor circuit is to identify a difference between a first file of the second version of the second graphical user interface and a second file of a third version of the second graphical user interface, and cause display of a textual representation of the difference within the first graphical user interface.

Example 12 includes the apparatus of example 11, wherein one or more of the at least one processor circuit is to cause one or more of the at least one processor circuit to cause display of a graphical representation of the difference in association with the first graphical user interface.

Example 13 includes the apparatus of example 12, wherein the graphical representation of the difference includes a first portion representing the second version of the second graphical user interface and a second portion representing the third version of the second graphical user interface.

Example 14 includes the apparatus of example 8, wherein the user commit information includes a username of a user that is logged into the first graphical user interface.

Example 15 includes a method comprising causing, by at least one processor circuit programmed by at least one instruction, presentation of a first graphical user interface to enable editing of a second graphical user interface of a process control system, the second graphical user interface based on information stored in a database, accessing, by one or more of the at least one processor circuit, a user instruction to modify the second graphical user interface from a first version to a second version, accessing, by one or more of the at least one processor circuit, user commit information associated with the second version, exporting, by one or more of the at least one processor circuit, the second version of the second graphical user interface from the database to a local file repository, and synchronizing the second version from the local file repository to a remote repository, the synchronization to include the user commit information.

Example 16 includes the method of example 15, further including synchronizing a third version of the second graphical user interface from the remote repository to the local file repository, importing the third version of the second graphical user interface from the local file repository to the database, and causing presentation of the third version of the second graphical user interface for editing within the first graphical user interface.

Example 17 includes the method of example 15, further including causing presentation of a version history of versions of the second graphical user interface stored at the remote repository.

Example 18 includes the method of example 17, further including identifying a difference between a first file of the second version of the second graphical user interface and a second file of a third version of the second graphical user interface, and causing display of a textual representation of the difference within the first graphical user interface.

Example 19 includes the method of example 18, further including causing display of a graphical representation of the difference in association with the first graphical user interface.

Example 20 includes the method of example 19, wherein the graphical representation of the difference includes a first portion representing the second version of the second graphical user interface and a second portion representing the third version of the second graphical user interface.

Example 21 includes the method of example 15, wherein the user commit information includes a username of a user that is logged into the first graphical user interface.

The following claims are hereby incorporated into this Detailed Description by this reference. Although certain example systems, apparatus, articles of manufacture, and methods have been disclosed herein, the scope of coverage of this patent is not limited thereto. On the contrary, this patent covers all systems, apparatus, articles of manufacture, and methods fairly falling within the scope of the claims of this patent.

What is claimed is:

1. At least one non-transitory machine-readable medium comprising machine-readable instructions to cause at least one processor circuit to at least:

cause presentation of a first graphical user interface to enable editing of a second graphical user interface of a process control system, the second graphical user interface based on information stored in a database;

access a user instruction to modify the second graphical user interface from a first version to a second version;

access user commit information associated with the second version;

export the second version of the second graphical user interface from the database to a local file repository;

synchronize the second version from the local file repository to a remote repository, the synchronization to include the user commit information;

identify a difference between a first file of the second version of the second graphical user interface and a second file of a third version of the second graphical user interface; and cause display of a textual representation of the difference within the first graphical user interface.

2. The at least one non-transitory machine-readable medium of claim 1, wherein the machine-readable instructions are to cause one or more of the at least one processor circuit to:

synchronize the third version of the second graphical user interface from the remote repository to the local file repository;

import the third version of the second graphical user interface from the local file repository to the database; and cause presentation of the third version of the second graphical user interface for editing within the first graphical user interface.

3. The at least one non-transitory machine-readable medium of claim 1, wherein the machine-readable instructions are to cause one or more of the at least one processor circuit to cause presentation of a version history of versions of the second graphical user interface stored at the remote repository.

4. The at least one non-transitory machine-readable medium of claim 1, wherein the machine-readable instructions are to cause one or more of the at least one processor circuit to cause display of a graphical representation of the difference via the first graphical user interface.

5. The at least one non-transitory machine-readable medium of claim 4, wherein the graphical representation of the difference includes a first portion representing the second version of the second graphical user interface and a second portion representing the third version of the second graphical user interface.

6. The at least one non-transitory machine-readable medium of claim 1, wherein the user commit information includes a username of a user that is logged into the first graphical user interface.

7. The at least one non-transitory machine-readable medium of claim 1, wherein the machine-readable instructions are to cause one or more of the at least one processor circuit to transform one or more records of the database into a corresponding file structure within the local file repository when exporting the second version of the second graphical user interface from the database to the local file repository.

8. An apparatus comprising:

interface circuitry;

machine-readable instructions; and at least one processor circuit to be programmed by the machine-readable instructions to:

cause presentation of a first graphical user interface to enable editing of a second graphical user interface of a process control system, the second graphical user interface based on information stored in a database;

access a user instruction to modify the second graphical user interface from a first version to a second version;

access user commit information associated with the second version;

export the second version of the second graphical user interface from the database to a local file repository;

synchronize the second version from the local file repository to a remote repository, the synchronization to include the user commit information;

identify a difference between a first file of the second version of the second graphical user interface and a second file of a third version of the second graphical user interface; and cause display of a textual representation of the difference within the first graphical user interface.

9. The apparatus of claim 8, wherein one or more of the at least one processor circuit is to:

synchronize the third version of the second graphical user interface from the remote repository to the local file repository;

import the third version of the second graphical user interface from the local file repository to the database; and cause presentation of the third version of the second graphical user interface for editing within the first graphical user interface.

10. The apparatus of claim 8, wherein one or more of the at least one processor circuit is to cause presentation of a version history of versions of the second graphical user interface stored at the remote repository.

11. The apparatus of claim 8, wherein one or more of the at least one processor circuit is to cause display of a graphical representation of the difference in association with the first graphical user interface.

12. The apparatus of claim 11, wherein the graphical representation of the difference includes a first portion representing the second version of the second graphical user interface and a second portion representing the third version of the second graphical user interface.

13. The apparatus of claim 8, wherein the user commit information includes a username of a user that is logged into the first graphical user interface.

14. The apparatus of claim 8, wherein one or more of the at least one processor circuit is to transform one or more records of the database into a corresponding file structure within the local file repository when exporting the second version of the second graphical user interface from the database to the local file repository.

15. A method comprising:

causing, by at least one processor circuit programmed by at least one instruction, presentation of a first graphical user interface to enable editing of a second graphical user interface of a process control system, the second graphical user interface based on information stored in a database;

accessing, by one or more of the at least one processor circuit, a user instruction to modify the second graphical user interface from a first version to a second version;

accessing, by one or more of the at least one processor circuit, user commit information associated with the second version;

exporting, by one or more of the at least one processor circuit, the second version of the second graphical user interface from the database to a local file repository;

synchronizing the second version from the local file repository to a remote repository, the synchronization to include the user commit information;

identifying a difference between a first file of the second version of the second graphical user interface and a second file of a third version of the second graphical user interface; and causing display of a textual representation of the difference within the first graphical user interface.

16. The method of claim 15, further including:

synchronizing the third version of the second graphical user interface from the remote repository to the local file repository;

importing the third version of the second graphical user interface from the local file repository to the database; and causing presentation of the third version of the second graphical user interface for editing within the first graphical user interface.

17. The method of claim 15, further including causing presentation of a version history of versions of the second graphical user interface stored at the remote repository.

18. The method of claim 15, further including causing display of a graphical representation of the difference in association with the first graphical user interface.

19. The method of claim 18, wherein the graphical representation of the difference includes a first portion representing the second version of the second graphical user interface and a second portion representing the third version of the second graphical user interface.

20. The method of claim 15, wherein the user commit information includes a username of a user that is logged into the first graphical user interface.

21. The method of claim 15, further including transforming one or more records of the database into a corresponding file structure within the local file repository when exporting the second version of the second graphical user interface from the database to the local file repository.

* * * * *